(12) United States Patent
Rajadurai et al.

(10) Patent No.: US 12,524,314 B1
(45) Date of Patent: Jan. 13, 2026

(54) CLOUD GATEWAY STORAGE

(71) Applicant: Samsara Inc., San Francisco, CA (US)

(72) Inventors: Karthikram Rajadurai, San Leandro, CA (US); Rhea Lin, New York, NY (US); Arthur Huang, San Francisco, CA (US); Vignesh Bhuvaneshwar Iyer, Los Altos, CA (US); Jason Symons, Dublin, CA (US); William Jennings, Brookhaven, GA (US); Yuri Melnikov, Conshohocken, PA (US); Meelap Shah, Portland, OR (US); Wayne Michelsen, Menlo Park, CA (US)

(73) Assignee: Samsara Inc., San Francisco, CA (US)

( * ) Notice: Subject to any disclaimer, the term of this patent is extended or adjusted under 35 U.S.C. 154(b) by 65 days.

(21) Appl. No.: 18/472,154

(22) Filed: Sep. 21, 2023

Related U.S. Application Data

(60) Provisional application No. 63/376,824, filed on Sep. 23, 2022.

(51) Int. Cl.
*G06F 11/14* (2006.01)
*G06V 10/94* (2022.01)
(Continued)

(52) U.S. Cl.
CPC .......... *G06F 11/1464* (2013.01); *G06V 10/95* (2022.01); *G06V 20/46* (2022.01);
(Continued)

(58) Field of Classification Search
CPC . G06F 11/1464; G06F 2201/84; G06V 20/52; G06V 20/46; G06V 10/95; H04N 5/91
(Continued)

(56) References Cited

U.S. PATENT DOCUMENTS

| 5,917,433 A | 6/1999 | Keillor et al. |
| 6,157,864 A | 12/2000 | Schwenke et al. |

(Continued)

FOREIGN PATENT DOCUMENTS

| WO | WO 2019/099409 A1 | 5/2019 |
| WO | WO 2019/125545 A1 | 6/2019 |

(Continued)

OTHER PUBLICATIONS

U.S. Appl. No. 18/472159, Cloud Storage Backend, filed Sep. 21, 2023.

(Continued)

*Primary Examiner* — Robert W Beausoliel, Jr.
*Assistant Examiner* — Lauren Zannah Ganger
(74) *Attorney, Agent, or Firm* — Knobbe, Martens, Olson & Bear, LLP

(57) ABSTRACT

A video gateway system at a worksite is coupled to multiple cameras on a network, and backs-up video streams generated by the cameras to a backend cloud backup video storage system and a frontend (cache) video storage system. The video gateway system generates an aggregated video asset from a plurality of streams of video from the multiple cameras, and generates metadata and a backup report associated with the video asset. The video asset, metadata, and backup report are stored on the backend cloud backup video storage system in an file system, and are also stored on the frontend (cache) video storage system such that for at least a period of time, the video asset and the associated the metadata and backup report are stored on both the cloud backup video storage system, facilitating quick access and retrieval to the stored video for retrieval for streaming, activity detection, and other uses.

20 Claims, 11 Drawing Sheets

(51) Int. Cl.
*G06V 20/40* (2022.01)
*G06V 20/52* (2022.01)
*H04N 5/91* (2006.01)

(52) U.S. Cl.
CPC .............. *G06V 20/52* (2022.01); *H04N 5/91* (2013.01); *G06F 2201/84* (2013.01)

(58) Field of Classification Search
USPC ........................................................ 707/654
See application file for complete search history.

(56) References Cited

U.S. PATENT DOCUMENTS

| | | |
|---|---|---|
| 6,452,487 B1 | 9/2002 | Krupinski |
| 6,801,920 B1 | 10/2004 | Wischinski |
| 7,596,417 B2 | 9/2009 | Fister et al. |
| 7,957,936 B2 | 6/2011 | Eryurek et al. |
| 8,024,311 B2 | 9/2011 | Wood et al. |
| 8,633,672 B2 | 1/2014 | Jung et al. |
| 9,024,744 B2 | 5/2015 | Klose et al. |
| 9,230,250 B1 | 1/2016 | Parker et al. |
| 9,445,270 B1 | 9/2016 | Bicket et al. |
| 9,477,639 B2 | 10/2016 | Fischer et al. |
| 10,033,706 B2 | 7/2018 | Bicket et al. |
| 10,085,149 B2 | 9/2018 | Bicket et al. |
| 10,102,495 B1 | 10/2018 | Zhang et al. |
| 10,173,486 B1 | 1/2019 | Lee et al. |
| 10,173,544 B2 | 1/2019 | Hendrix et al. |
| 10,185,628 B1 * | 1/2019 | Snyder ................ H04L 67/1097 |
| 10,196,071 B1 | 2/2019 | Rowson et al. |
| 10,206,107 B2 | 2/2019 | Bicket et al. |
| 10,388,075 B2 | 8/2019 | Schmirler et al. |
| 10,390,227 B2 | 8/2019 | Bicket et al. |
| 10,444,949 B2 | 10/2019 | Scott et al. |
| 10,579,123 B2 | 3/2020 | Tuan et al. |
| 10,609,114 B1 | 3/2020 | Bicket et al. |
| 10,623,899 B2 | 4/2020 | Watkins et al. |
| 10,827,324 B1 | 11/2020 | Hajimiri et al. |
| 10,843,659 B1 | 11/2020 | Innocenzi et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,046,205 B1 | 6/2021 | Govan et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,131,986 B1 | 9/2021 | Gal et al. |
| 11,132,853 B1 | 9/2021 | Akhtar et al. |
| 11,137,744 B1 | 10/2021 | Heddleston et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,365,980 B1 | 6/2022 | Akhtar et al. |
| 11,386,325 B1 | 7/2022 | Srinivasan et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,800,317 B1 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 12,140,445 B1 | 11/2024 | Akhtar et al. |
| 12,150,186 B1 | 11/2024 | Aguilar et al. |
| 12,165,360 B1 | 12/2024 | Jain et al. |
| 12,168,445 B1 | 12/2024 | Srinivasan et al. |
| 12,172,653 B1 | 12/2024 | Akhtar et al. |
| 12,179,629 B1 | 12/2024 | Govan et al. |
| 12,197,610 B2 | 1/2025 | Wen et al. |
| 12,213,090 B1 | 1/2025 | Dergosits et al. |
| 12,228,944 B1 | 2/2025 | Dubin et al. |
| 12,253,617 B1 | 3/2025 | Aguilar et al. |
| 12,256,021 B1 | 3/2025 | Torres et al. |
| 12,260,616 B1 | 3/2025 | Rajan et al. |
| 12,269,498 B1 | 4/2025 | Rommel et al. |
| 12,289,181 B1 | 4/2025 | Stevenson et al. |
| 12,306,010 B1 | 5/2025 | Rommel et al. |
| 12,327,445 B1 | 6/2025 | Eberhardt et al. |
| 12,328,639 B1 | 6/2025 | Smith et al. |
| 12,344,168 B1 | 7/2025 | Wang et al. |
| 12,346,712 B1 | 7/2025 | Eberhardt et al. |
| 12,367,718 B1 | 7/2025 | Calmer et al. |
| 12,368,903 B1 | 7/2025 | Lin et al. |
| 2002/0061758 A1 | 5/2002 | Zarlengo et al. |
| 2002/0169850 A1 | 11/2002 | Batke et al. |
| 2005/0286774 A1 | 12/2005 | Porikli |

(56) References Cited

U.S. PATENT DOCUMENTS

| | | |
|---|---|---|
| 2006/0167591 A1 | 7/2006 | McNally |
| 2008/0319602 A1 | 12/2008 | Mcclellan et al. |
| 2009/0240427 A1 | 9/2009 | Siereveld et al. |
| 2010/0049639 A1 | 2/2010 | Ferro et al. |
| 2010/0235432 A1 | 9/2010 | Trojer |
| 2011/0276265 A1 | 11/2011 | Husain |
| 2012/0201277 A1 | 8/2012 | Tanner et al. |
| 2012/0235625 A1 | 9/2012 | Takehara |
| 2012/0303397 A1 | 11/2012 | Prosser |
| 2013/0162421 A1 | 6/2013 | Inaguma et al. |
| 2013/0211559 A1 | 8/2013 | Lawson et al. |
| 2013/0244210 A1 | 9/2013 | Nath et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0195106 A1 | 7/2014 | McQuade et al. |
| 2014/0278108 A1 | 9/2014 | Kerrigan et al. |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0044641 A1 | 2/2015 | Chauncey et al. |
| 2015/0074091 A1 | 3/2015 | Walkin et al. |
| 2015/0226563 A1 | 8/2015 | Cox et al. |
| 2015/0283912 A1 | 10/2015 | Shimizu et al. |
| 2016/0014482 A1 | 1/2016 | Chen et al. |
| 2016/0057194 A1 | 2/2016 | Fujimori |
| 2016/0275376 A1 | 9/2016 | Kant |
| 2016/0288744 A1 | 10/2016 | Rutherford et al. |
| 2016/0343091 A1 | 11/2016 | Han et al. |
| 2016/0375780 A1 | 12/2016 | Penilla et al. |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0123397 A1 | 5/2017 | Billi et al. |
| 2017/0140603 A1 | 5/2017 | Ricci |
| 2017/0195265 A1 | 7/2017 | Billi et al. |
| 2017/0263049 A1 | 9/2017 | MacDonald et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0093672 A1 | 4/2018 | Terwilliger et al. |
| 2018/0234514 A1 | 8/2018 | Rajiv et al. |
| 2018/0262724 A1 | 9/2018 | Ross |
| 2018/0356800 A1 | 12/2018 | Chao et al. |
| 2018/0364686 A1 | 12/2018 | Naidoo et al. |
| 2019/0003848 A1 | 1/2019 | Hoten et al. |
| 2019/0069046 A1 | 2/2019 | Sauer et al. |
| 2019/0118655 A1 | 4/2019 | Grimes et al. |
| 2019/0174158 A1 | 6/2019 | Herrick et al. |
| 2019/0244301 A1 | 8/2019 | Seth et al. |
| 2019/0286948 A1 | 9/2019 | Sathyanarayana et al. |
| 2019/0318419 A1 | 10/2019 | VanderZanden |
| 2019/0327504 A1 | 10/2019 | Jindal et al. |
| 2019/0327590 A1 | 10/2019 | Kubo et al. |
| 2019/0327613 A1 | 10/2019 | Bicket et al. |
| 2020/0074397 A1 | 3/2020 | Burda et al. |
| 2020/0137354 A1* | 4/2020 | Nathan .................. G06V 20/52 |
| 2020/0139847 A1 | 5/2020 | Baumer et al. |
| 2020/0150739 A1 | 5/2020 | Tuan et al. |
| 2020/0162489 A1 | 5/2020 | Bar-Nahum et al. |
| 2020/0342230 A1 | 10/2020 | Tsai et al. |
| 2020/0342235 A1 | 10/2020 | Tsai et al. |
| 2020/0342274 A1 | 10/2020 | ElHattab et al. |
| 2020/0342506 A1 | 10/2020 | Levy et al. |
| 2020/0342611 A1 | 10/2020 | ElHattab et al. |
| 2020/0344301 A1 | 10/2020 | ElHattab et al. |
| 2020/0371773 A1 | 11/2020 | Kato et al. |
| 2020/0389415 A1 | 12/2020 | Zhao et al. |
| 2020/0413112 A1 | 12/2020 | Knecht et al. |
| 2021/0006950 A1 | 1/2021 | Hajimiri et al. |
| 2022/0289203 A1 | 9/2022 | Makilya et al. |
| 2022/0417610 A1 | 12/2022 | Chandrashekar et al. |
| 2023/0219592 A1 | 7/2023 | Calmer et al. |
| 2023/0298410 A1 | 9/2023 | Calmer et al. |
| 2024/0003749 A1 | 1/2024 | Lin et al. |
| 2024/0048782 A1 | 2/2024 | Heikkinen et al. |
| 2024/0063596 A1 | 2/2024 | Pandian et al. |
| 2024/0119737 A1* | 4/2024 | Li ........................... G06V 20/52 |
| 2024/0143451 A1* | 5/2024 | Shemer ............... G06F 11/1461 |
| 2024/0146629 A1 | 5/2024 | Lloyd |
| 2025/0002033 A1 | 1/2025 | Calmer et al. |
| 2025/0046084 A1* | 2/2025 | Yadav .................... H04N 23/90 |

FOREIGN PATENT DOCUMENTS

| | | |
|---|---|---|
| WO | WO 2019/133533 A1 | 7/2019 |
| WO | WO 2023/244513 A1 | 12/2023 |

OTHER PUBLICATIONS

Malamas, Elias N. et al. "A survey on industrial vision systems, applications and tools", Sep. 17, 2002, Image and Vision Computing 21, pp. 171-188.

\* cited by examiner

CLOUD GATEWAY STORAGE

TECHNICAL FIELD

Embodiments of the present disclosure relate to devices, systems, and methods that receive video data from multiple cameras, locally store the video data, and upload the video data to a cloud storage system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing sensor data from on-premises equipment, such as cameras that provide varying video streaming capabilities, requires significant data storage and processing power. For example, if only a high-resolution video stream is available, feature detection and/or other processing of the video stream may require significant processing and storage resources. Users (e.g., users of a site monitoring service that provides cloud storage of video data) may also have various needs for retaining historical footage, including meeting strict regulatory compliance requirements. Users may want options for both redundancy and extending the duration of time footage is preserved. Uploading footage to the cloud requires overcoming bandwidth and quality challenges, as many of users may not have the upload bandwidth at their sites to support constant streaming of full resolution streams to the cloud. For some users with limited bandwidth, retention requirements might be met by connecting a local storage device. However, local storage devices have size limitations and accessibility limitations. It would be advantageous to address these issues and provide more secure, easier to access video storage, while taking into account a user's bandwidth limitations, and addressing performance issues with processing video streams.

SUMMARY

The systems, methods, and devices described herein each have several aspects, no single one of which is solely responsible for its desirable attributes. Without limiting the scope of this disclosure, several non-limiting features will now be described briefly.

Clause 1. A video gateway system, comprising: a computing system comprising a hardware computer processor, and a non-transitory computer readable medium having software instructions stored thereon, the software instructions executable by the hardware computer processor to cause a backup service on the computing system to perform operations comprising: communicate with a plurality of cameras positioned at different locations associated with a physical location and at least temporarily store the video streams generated by each of the plurality of cameras; receive a configuration file from a backend cloud storage service, the configuration file including information associated with backing-up video on a cloud storage system including whether backup functionality is enabled; fetch stored video frames that were generated by the plurality of cameras; aggregate the fetched video frames into a consolidated video asset for storage on the cloud storage system; generate metadata associated with the video asset, the metadata including information relating to the location of each video stream in the video asset; generate a cloud backup report associated with the video asset, the cloud backup report including camera information and stream information of each video stream stored in the video asset; communicate with the cloud storage system backend to receive a cloud storage location information indicating where to store the video asset on the cloud storage system; communicate the video asset to the cloud storage system based on the location information; and communicate the video asset, the metadata, and the backup report to a frontend file system, such that the video asset, the metadata, and the backup report on the frontend file system will be duplicative of the video asset, the metadata, and the backup report on the cloud backup video storage system for a period of time.

Clause 2. The video gateway system of clause 1, further comprising a network video recorder configured to store video streams from the plurality of cameras.

Clause 3. The video gateway system of clause 2, wherein the computing system further comprises a feature detection component configured to perform feature detection on video stored on the network video recorder.

Clause 4. The video gateway system of clause 2, further comprising an activity service that monitors video streams stored on the network video recorder to detect an activity that is depicted in the stored video streams.

Clause 5. The video gateway system of clause 4, wherein the backup service fetches video stream streams associated with a detected activity, aggregates the video streams into a video asset, and communicates the video asset to the cloud backup system based on the detected activity.

Clause 6. The video gateway system of clause 1, wherein the backup service receives a communication based on an activity service that monitors video streams stored on the frontend file storage system for activity, and based on the communication, the backup service fetches video stream streams associated with a detected activity, aggregates the video streams into a video asset, and communicates the video asset to the cloud backup video storage system.

Clause 7. The video gateway system of clause 1, wherein the backup service is configured to communicate the video asset to the cloud storage system at a predetermined.

Clause 8. The video gateway system of clause 1, wherein the backup service is configured to communicate the video asset to the file system at a predetermined time.

Clause 9. The video gateway system of clause 1, wherein the backup service checks what is stored on the cloud backup system using the configuration file.

Clause 10. The video gateway system of clause 1, wherein the backup service determines what to store on the cloud backup system using the configuration file.

Clause 11. The video gateway system of clause 1, wherein the configuration file includes information relating to whether cloud backup functionality is on/off.

Clause 12. The video gateway system of clause 11, wherein the configuration file further includes a changeable and configurable retry interval and frequency, a video upload size, and/or the number of concurrent streams that can be uploaded.

Clause 13. A video gateway system, comprising: a computing system comprising a hardware computer processor, and a non-transitory computer readable medium having software instructions stored thereon, the software instructions executable by the hardware computer processor to cause a backup service on the computing system to perform operations comprising: communicate with a plurality of cameras positioned at different locations associated with a physical location and at least temporarily store the video streams generated by each of the plurality of cameras; receive a configuration report from a backend cloud storage service, the configuration report including information associated with backing-up video on a cloud storage system including whether backup functionality is enabled; fetch stored video frames that were generated by the plurality of cameras; aggregate the fetched video frames into a consolidated video asset for storage on the cloud storage system; generate metadata associated with the video asset, the metadata including information relating to the location of each video stream in the video asset; generate a cloud backup report associated with the video asset, the cloud backup report including camera information and stream information of each video stream stored in the video asset; communicate the video asset, the metadata, and the backup report to a frontend file system, such that the video asset, the metadata, and the backup report on the frontend file system will be duplicative of the video asset, the metadata, and the backup report on the cloud backup video storage system for a period of time; communicate by an uploader service with the cloud storage system backend to receive a cloud storage location information indicating where to store the video asset on the cloud storage system; and communicate, by the uploader service, the video asset to the cloud storage system based on the location information.

Clause 14. The video gateway system of clause 13, further comprising a network video recorder configured to store video streams from the plurality of cameras.

Clause 15. The video gateway system of clause 13, wherein the computing system further comprises a feature detection component configured to perform feature detection on video stored on the network video recorder.

Clause 16. The video gateway system of clause 13, further comprising an activity service that monitors video streams stored on the network video recorder to detect an activity that is depicted in the stored video streams.

Clause 17. The video gateway system of clause 16, wherein the backup service fetches video stream streams associated with a detected activity, aggregates the video streams into a video asset, and communicates the video asset to the cloud backup system based on the detected activity.

Clause 18. A method of storing video on a backend cloud storage system, the method comprising: receiving a configuration report from the cloud storage system, the configuration report including information associated with backing-up video on the cloud storage system including whether backup functionality is enabled; fetching stored video streams that were generated by a plurality of cameras; aggregating the fetched video frames into a consolidated video asset; generating metadata associated with the video asset, the metadata including information relating to the location of each video stream in the video asset; generating a cloud backup report associated with the video asset, the cloud backup report including camera information and stream information of each video stream stored in the video asset; communicating with the cloud storage system to receive a cloud storage location indicating where to store the video asset on the cloud storage system; communicating the video asset to the cloud storage system based on the location information; and communicating the video asset, the metadata, and the backup report to a frontend file system, such that the video asset, the metadata, and the backup report on the frontend file system will be duplicative of the video asset, the metadata, and the backup report on the cloud backup video storage system for a period of time, wherein the method is performed by one or more computer hardware processors configured to execute computer-executable instructions stored on a non-transitory computer readable medium.

Clause 19. The method of clause 18, wherein the cloud storage system comprises a network video recorder configured to store video streams from the plurality of cameras.

Clause 20. The method of clause 18, wherein the cloud storage system comprises a feature detection component configured to perform feature detection on video stored on the network video recorder.

Clause 21. A video streaming system, comprising: a computing system comprising a hardware computer processor, and a non-transitory computer readable medium having software instructions stored thereon, the software instructions executable by the hardware computer processor to cause a streaming service on the computing system to perform operations comprising: receiving a stream request for video from a cloud server; determining a playlist that indicates where the video segments needed to fulfill the stream request are stored, where determining the playlist includes: fetching, from a video cache system, cache information indicating video segments needed to fulfill the video stream request that are stored on the video cache system; determining, based on the cache information, if all the video segments needed to fulfill the video stream request are stored on the video cache system and if not, fetching, from a cloud backup system backup information indicating video segments that are needed to fulfill the video stream request that are stored on the cloud backup system; in response to receiving the backup information, determining, based on received cache information and backup information, if all the video segments that are needed to fulfill the video stream request are stored on the video cache system and the cloud backup system, and if not, fetching, from a gateway system, storage information of video segments that are needed to fulfill the video stream request that are stored on the gateway system; and generating the playlist based on received cache information, the backup information, and the storage information.

Clause 22. The video streaming system of clause 21, wherein the software instructions executable by the hardware computer processor further cause the streaming service on the computing system to perform operations comprising fetching video streams from the video cache system, cloud backup system, and/or the gateway system based on the playlist.

Clause 23. The video streaming system of clause 21, wherein the software instructions executable by the hardware computer processor further cause the streaming service on the computing system to perform operations comprising providing the requested video steam to the cloud server.

Clause 24. The video streaming system of clause 21, wherein the software instructions executable by the hardware computer processor further cause the streaming service to fetch video files needed to fulfil the stream request and that are stored on the cloud backup system, and store the fetched videos on the video cache system, update the playlist to indicate the fetched video is now stored on the video cache system.

Clause 25. The video streaming system of clause 24, wherein the software instructions executable by the hardware computer processor further cause the streaming service to fetch video files needed to fulfil the stream request and that are stored on the gateway system, store the fetched video on the video cache system, update the playlist to indicate the fetched video is now stored on the video cache system.

Clause 26. The video streaming system of clause 25, wherein the software instructions executable by the hardware computer processor further cause the streaming service to fetch all the video streams from the video cache system based on the playlist and provide the requested video steam to the cloud server.

Clause 27. The video streaming system of clause 21, wherein the video cache system comprises a database and a video cache storage component, wherein the database is configured to store information indicative of the video stored in the video cache storage.

Clause 28. The video streaming system of clause 27, wherein the video server is further configured to communicate all the video segments indicated on the playlist from the video cache system to the cloud server.

Clause 29. A method of providing streaming video, the method comprising: receiving a stream request for video from a cloud server; determining a playlist that indicates where the video segments needed to fulfill the stream request are stored, where determining the playlist includes: fetching, from a video cache system, cache information indicating video segments needed to fulfill the video stream request that are stored on the video cache system; determining, based on the cache information, if all the video segments needed to fulfill the video stream request are stored on the video cache system and if not, fetching, from a cloud backup system backup information indicating video segments that are needed to fulfill the video stream request that are stored on the cloud backup system; in response to receiving the backup information, determining, based on received cache information and backup information, if all the video segments that are needed to fulfill the video stream request are stored on the video cache system and the cloud backup system, and if not, fetching, from a gateway system, storage information of video segments that are needed to fulfill the video stream request that are stored on the gateway system; and generating the playlist based on received cache information, the backup information, and the storage information; wherein the method is performed by one or more computer hardware processors configured to execute computer-executable instructions stored on a non-transitory computer readable medium.

Clause 30. The method of clause 29, further comprising fetching video streams from the video cache system, cloud backup system, and/or the gateway system based on the playlist.

Clause 31. The method of clause 29, further comprising providing the requested video stream to the cloud server.

Clause 32. The method of clause 29, further comprising fetching video files needed to fulfil the stream request and that are stored on the cloud backup system, storing the fetched videos on the video cache system, and updating the playlist to indicate the fetched video is now stored on the video cache system.

Clause 33. The method of clause 32, further comprising fetching video files needed to fulfil the stream request and that are stored on the gateway system, storing the fetched video on the video cache system, and updating the playlist to indicate the fetched video is now stored on the video cache system.

Clause 34. The method of clause 33, further comprising fetching video streams from the video cache system based on the playlist and provide the requested video steam to the cloud server.

Clause 35. The method of clause 34, further comprising updating a database to indicate where video storage locations for the video needed to fulfill the stream request.

Clause 36. The method of clause 35, further comprising communicating all the video segments indicated on the playlist to the cloud server using the video location information in the database.

Clause 37. A non-transitory computer readable medium having software instructions stored thereon, the software instructions executable by a hardware computer processor to cause a computing system to perform operations comprising: receiving a stream request for video from a cloud server; and determining a playlist that indicates where the video segments needed to fulfill the stream request are stored, where determining the playlist includes: fetching, from a video cache system, cache information indicating video segments needed to fulfill the video stream request that are stored on the video cache system; determining, based on the cache information, if all the video segments needed to fulfill the video stream request are stored on the video cache system and if not, fetching, from a cloud backup system backup information indicating video segments that are needed to fulfill the video stream request that are stored on the cloud backup system; in response to receiving the backup information, determining, based on received cache information and backup information, if all the video segments that are needed to fulfill the video stream request are stored on the video cache system and the cloud backup system, and if not, fetching, from a gateway system, storage information of video segments that are needed to fulfill the video stream request that are stored on the gateway system; and generating the playlist based on received cache information, the backup information, and the storage information.

Clause 38. The non-transitory computer readable medium of clause 37, further comprising fetching video streams from the video cache system, cloud backup system, and/or the gateway system based on the playlist.

Clause 39. The non-transitory computer readable medium of clause 37, further comprising providing the requested video stream to the cloud server.

Clause 40. The non-transitory computer readable medium of clause 37, further comprising fetching video files needed to fulfil the stream request and that are stored on the cloud backup system, storing the fetched videos on the video cache system, and updating the playlist to indicate the fetched video is now stored on the video cache system.

Various embodiments of the present disclosure provide improvements to various technologies and technological fields, and practical applications of various technological features and advancements. For example, existing gateway systems are limited in various ways, such as video backup and retrieval systems provided by frontend systems or backend storage systems. Various embodiments of the present disclosure provide significant improvements over such technology, and practical applications of such improvements. Additionally, various embodiments of the present disclosure are inextricably tied to, and provide practical applications of, computer technology. In particular, various embodiments rely on the video backup and retrieval system architecture. Such features and others are intimately tied to, and enabled by, would not exist except for video data backup, retrieval and streaming technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
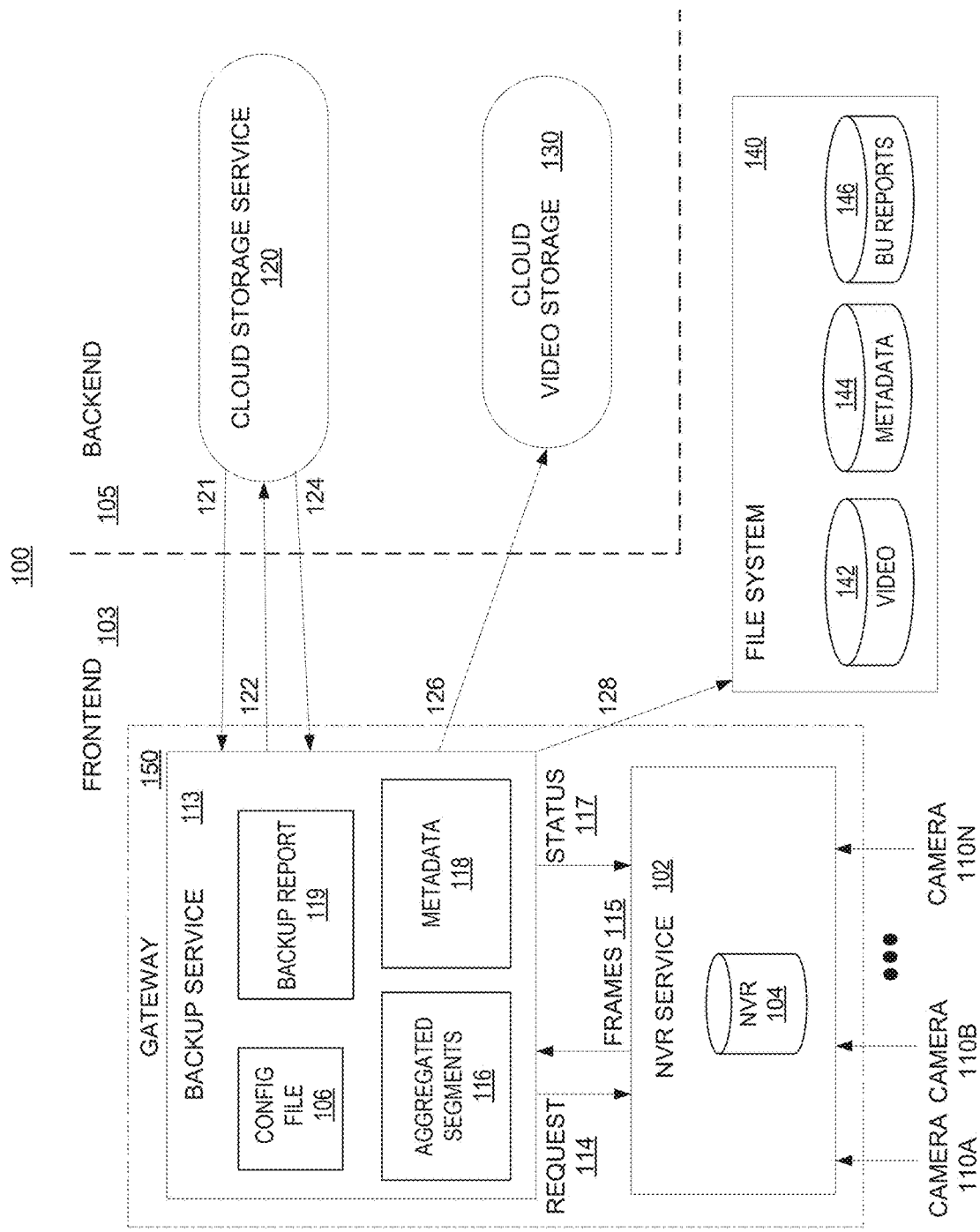
FIG. 1 is a block diagram of an example of a backup system and backup service functionality for a system with multiple cameras communicating with a network video recorder (NVR), and where the backup service is configured to store video segments (or streams) on a backend cloud video storage system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

In some embodiments discussed herein, a video gateway device ("gateway") at a site is coupled to multiple cameras on a network, for example, multiple cameras at a business site. The gateway receives video segments ("video") from the cameras, and uploads received video to a cloud backup system. The gateway is configured to store a certain amount of the received video itself, and periodically uploads some of the video to the cloud backup system. The gateway can be controlled by an interface that is configured to receive user input to control when to enable the gateway to upload the video segments and control when uploads are made.

The cloud backup is configured such that if a camera/gateway goes offline (an "outage") the footage that has been successfully uploaded to the cloud prior to the outage can be viewed. Once the connection to the cloud is re-established, the gateway can again upload video segments to the cloud.

The cloud backup captures information (e.g., statistics) relating to each upload attempt. Once cloud backup is enabled for a particular video stream, a cloud backup service of a gateway can upload video stored on disk for that video stream. Video can be aggregated on the gateway and transmitted to the cloud in response to user requests for video segments, according to a schedule and/or based on upload rules. Once a certain amount of video is stored it can be uploaded to the cloud. For example, a threshold size of stored video can be determined, and once the size of the stored video is greater than a certain size it can be uploaded. A configuration file on the gateway can control aspects of the cloud backup feature. Changes to the configuration file can be made remotely and/or through a local user interface to the gateway.

In various embodiments of the disclosed systems, each individual camera stream can have an option to enable cloud backup for a dynamic or predetermined time period, such as between 30 and 360 days, in increments of a certain time period, e.g., 30 days. In an example, provided user licenses for storage for a selected period can correlate to the number of days of storage and the resolution of the stream. In some implementations, when the number of days of footage stored for a specific stream exceeds the duration specified for that stream, the backend cloud storage system should delete footage older than the number of days selected. In some embodiments, if a user disables cloud storage on a stream, the historical footage is deleted 24 hours after cloud storage is disabled. User will need enough upload bandwidth to support the bitrate of each camera they enable for cloud backup bandwidth. In some embodiments, a user interface can provide information relating to upload bandwidth, number of cameras, bitrate of cameras, historical bitrate for a stream, and other information needed to determine a specific user's storage requirements based on the configuration of their monitoring system. In some embodiments, the backup system can provide an indication or alert if the gateway cannot keep up with uploading specified streams to the cloud because of limited bandwidth after a period of 24 hours. The alert can be, for example, an electronic message including an email or a text message, or the alert can be generated and displayed on a user interface configured to show information relating to the backup system. In some embodiments, the backup system can communicate how much upload bandwidth is being consumed by streams with cloud backup enabled, for example, on a gateway diagnostics page. Cloud storage should only begin being persisted once the cloud storage feature is enabled. Any historic footage stored on the gateway should not be transferred to the cloud backup storage. Cloud storage can be redundant with local storage. For example, if a user is achieving 30 days of the gateway storage devices, and chooses the 30 day cloud option, the same footage will be stored on both the gateway and the cloud after 30 days. If they choose the 90 day option, an additional 60 days of footage can be stored in the cloud as compared to the gateway.

Video that is stored in the cloud can be cached on a frontend file system (or video cache system) such that at least for a period of time, the frontend file system includes duplicative data of a portion of data that is on the cloud backup storage system in a file system. The frontend file system can include a caching workforce video DB and S3 cloud backup database can be used as a persistent (cached) cloud backup store for backed-up video segments. In some embodiments that include a cloud backup DB and cloud storage of the video, a workforce video database that resides locally (e.g., not on the cloud) can be used to stream cached video such that if requested video is available on the frontend file system it can be streamed without having to perform a download from the cloud backup system streaming cache. Video can be cached in the frontend file system when requested for viewing. And videos that have not been viewed for a predetermined threshold of time can be cleared from the video cache system such that they are only stored on the cloud backup (S3) video storage.

Users have various needs for retaining historical footage, including meeting strict regulatory compliance requirements. In addition, users want options for both redundancy and extending the duration of time footage is preserved. Aspects of the disclosed architecture provide users with the option to opt in to backing up footage to the cloud on a per-stream, calendar duration basis. In some embodiments, each individual camera stream can have an option to select from a tiered storage option. In an example, five tiers of storage are offered based on a cadence of 30/60/90/180/360 days of footage retention in the cloud at a 1 Mbps standard bitrate. For example, 30 days (0.3 TB), 60 days (0.6 TB), 90 (0.9 TB), 180 (1.9 TB), 360 (3.9 TB). An expiration date can be set for all video stored in the cloud backup database. In an example, during a video upload, expiration dates will be set on S3 stored video and indicated in cloud storage database rows accordingly. In some examples, the tiered storage options a user can choose are based on the actual duration from an individual camera, or a group of cameras. In another example, the tiered storage options a user can choose are based on the actual amount of storage (e.g, the amount of terabytes (TB)).

A user may opt-in to a certain number of days storage tier, and this can be done on a per camera basis. This is useful, for example, when a video duration storage requirement for monitoring a first location at a worksite is different than the video duration storage requirement of a second location at the worksite. For example, 30 days, 60 days, 90 days, etc. In some implementations, video generated by each or some of the cameras at a worksite may have the same duration storage requirement. In some implementations, video generated by each of the cameras at a worksite can have a different duration storage requirement. In various implementations, the duration storage requirement for each camera may be less than one day. In various implementations, the duration storage requirement for video may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 days, plus or minus one half a day. In some implementations, the duration storage requirement for video may be 1, 2, 3, 4, 5, 6, 7, 8, 9, 10, 11, or 12 months, plus a number of days, where the number or days equals 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or 31. In some embodiments the duration storage requirement may be greater than 1, 2, 3, 4, 5, 6, 7, 8, 9, or 10 years, or forever (e.g., while doing business) although such long time video storage duration requirement are not typical.

Based on the storage requirements, user may pay for video storage on a tier basis, where the tier is related to the duration and how much video storage (size) that duration requires, which can depend on the number of cameras, resolution, whether it is activity events, etc. Having flexible storage options is advantageous to the user so they can meet their video retention needs when they exceed the capacity the site storage system (e.g., site gateway, site visibility system, both which can be referred to as the "gateway"), and the users will have a reliable cloud backup that is not constrained by availability. This can be advantageous for the storage provider as well due to extended retention and increased revenue through new cloud licenses; additional video footage stored in our cloud that can be used for machine learning (ML) model training.

In some embodiments, to reduce the amount of upload bandwidth required, a feature can be enabled to only upload when there is motion, person, or vehicle activity in a stream. In some implementations, video should be deleted after the number of calendar days specified has passed, but instead only after the cumulative time recorded exceeds the number of days configured for retention. In another aspect, the oldest date with recorded footage currently being retained can be communicate to a user, e.g., on a user interface. In some embodiments, only standard definition video is uploaded when no activity is present, and high definition (e.g., a higher definition) video is uploaded when there is activity detected in the video. In some embodiments, to reduce the amount of upload bandwidth used during the day when there is likely to be less bandwidth available, an option can be enabled to schedule a time period during which the cloud backup will operate.

Figure 7:
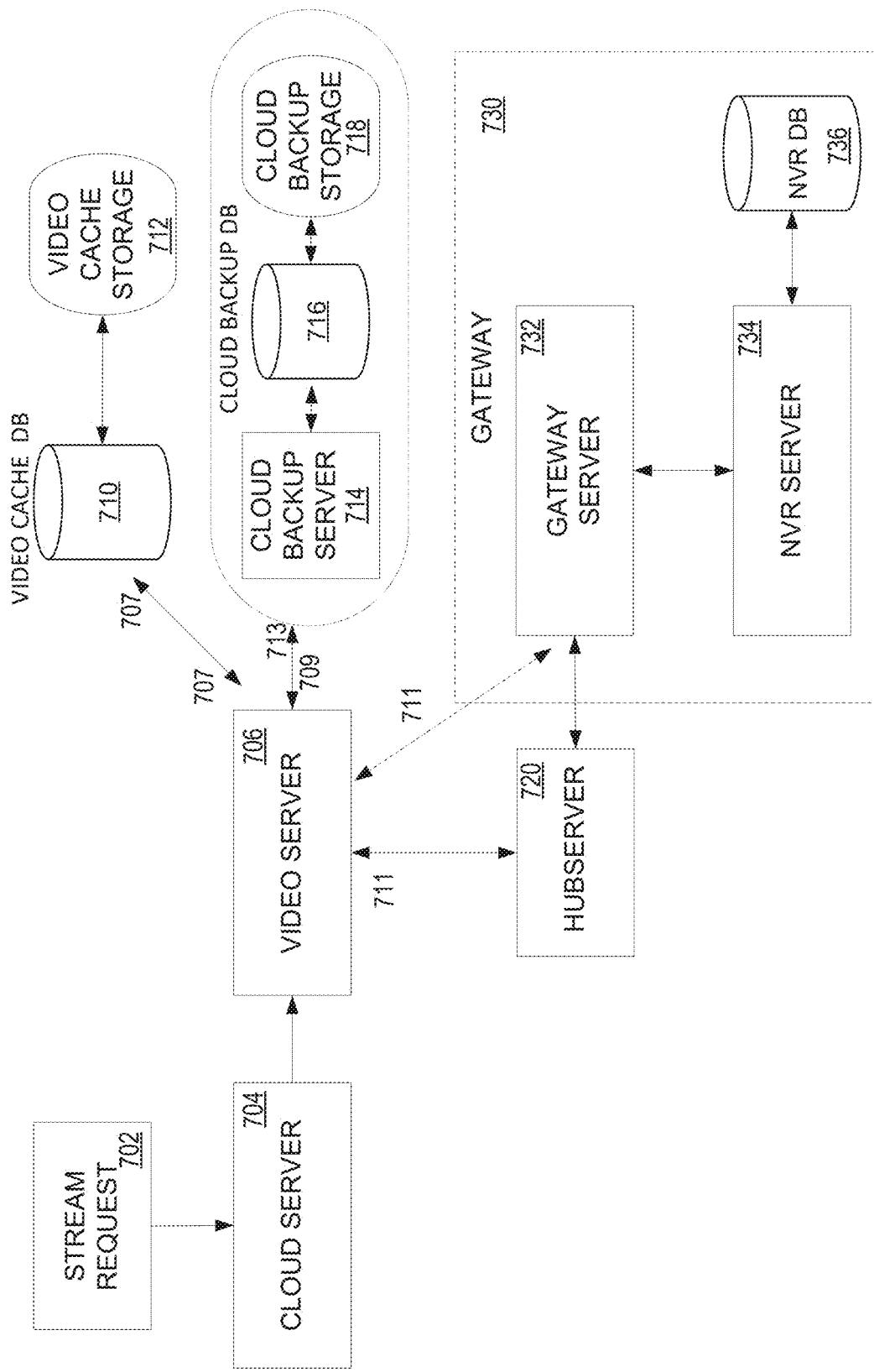
FIG. 7 is a block diagram of an example of a process flow and a system for fetching video playlist to construct a requested video stream that includes a plurality of vide segments which may be cached video segments, cloud backed-up video segments, and locally stored video segments.
Figure 8:
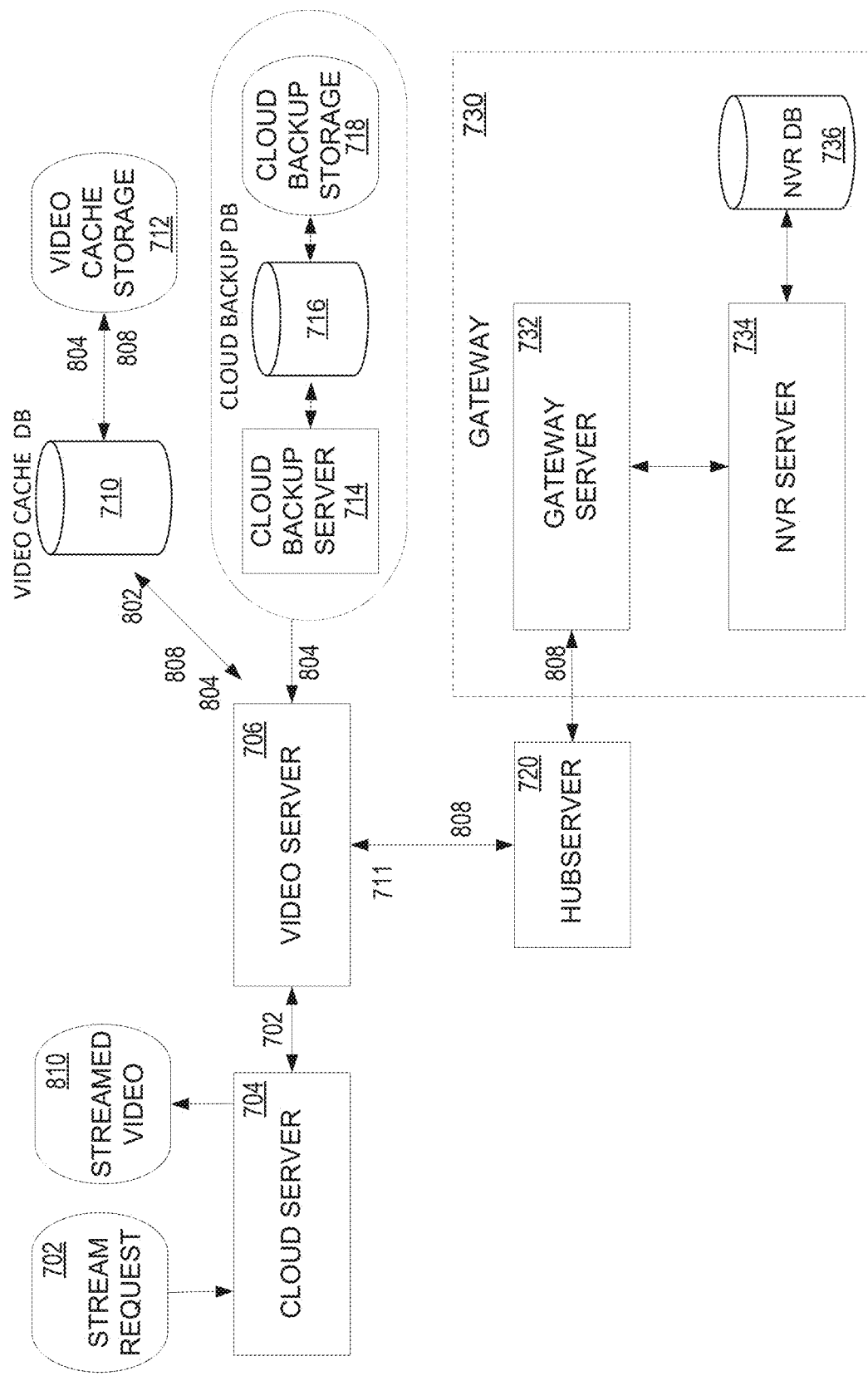
FIG. 8 is a block diagram of an example of a process flow and a system for fetching video in response to a stream request for streaming video, where the video segments are cached video segments, cloud backed-up video segments, and locally stored video segments.

In some embodiments, video can be cached in a video storage system that is not in the cloud when (i) someone has watched the video, either in historical mode or live-streamed via HLS, or (ii) when the video is saved to the cloud backup file system (at least for awhile so that is readily available if needed, or (iii) when the video was downloaded, for example, downloaded from the cloud backup file system 718 (FIG. 8). A table in the video streaming/cache DB 710 (FIG. 7) contains video segment information associated with video data that is cached. The video data referenced in the information in the video streaming/cache DB 710 is stored in a video cache file system 712 (FIG. 7), that is, in a container on a cloud storage device. In an example, each video asset (a stored portion of video) is an HLS inter-keyframe segment. In some embodiments, video that's been saved to the library/downloaded will remain in the video cache file system 712 forever. For all other video cache data, a default expiration can be defined. Library videos should be deleted if the organization is deleted (or after a certain time period after the organization is deleted.

Video can be backed-up to the cloud if a user has opted-in for cloud storage. For example, video generated after the user has opted-in will be saved in cloud storage. Information of stored video segments will be stored in a table (e.g., the video segments table) in a database on the cloud (e.g., the cloud backup DB) The actual video data will be stored in a file system for cloud backup. Each video backed-up is video consisting of multiple HLS inter-keyframe segments. Video will be deleted from cloud backup it it's older than a retention policy associated with the stream. If the organization the site gateway, or the site camera that generated a particular stream is deleted, the associated backed-up video may also be deleted after a period of time (e.g., 24 hours).

Generally, to backup video, the backend communicates to the site gateway via a configuration file (e.g., "cloud backup config") to enable cloud backup. The site gateway handles uploading the video to the file system at a URL that it request from the backend. Certain embodiments are described in reference to FIGS. 1, 5 and 6.

Stored video can be fetched from the video cache, the cloud backup, and/or a local video storage system (the "Site Gateway"). To determine where the requested video is requested, a playlist based on the video stream request is generated. Each of the video cache, the cloud backup, and/or a local video storage system is queried by a video server based on the stream request, and if video in the stream request is stored that information is passed back to the video server (e.g., in the form of a list). An example of generating a playlist is described in reference to FIG. 7. Once the video server knows which video segments are available on each of the video cache, the cloud backup, and/or a local video storage system it can fetch the video and create the requested video stream. In preferred embodiments, to fetch video, if the requested video is available in the video cache, as much video as is available to meet the stream request is fetched. To service the stream request, the video server fetches as much video from the video cache first because is typically communicated to the video server at the highest speed. Then, if the video is available from the cloud backup file system, the video server fetches video from the cloud backup file system. Finally, the video server fetches video from the Site Gateway for any video not in cloud backup file system and not available in the video cache.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Camera: as used herein the term "camera" is a broad term referring to any kind of an electronic device that collects data, typically over a period of time, either continuously or at discrete points in time, or both. For ease of reference, as used herein both sensors and cameras (e.g., video cameras) are referred to as a camera. Thus, a camera may be a video camera that streams a single resolution of video data, such as a high-resolution video stream, while another camera may stream both a high-resolution video stream and a low-resolution video stream. A camera may be in communication with a local gateway device, or local site visibility system, via one or more wired and/or wireless connections, such as via a local area network. Some embodiments include one or more cameras, for example, a plurality of video cameras 110A, 110B, 110N as illustrated in FIG. 1. Such sensors can include smart sensors, and any type of sensor, configured to sense a condition of an environment (e.g., optical images/data including video, IR images/data including video, temperature, moisture, motion, distance, etc.) and communicate data to the data recording system. A sensor may be coupled to a video camera or housed separately, and located proximate to a video camera or located apart from a video camera. Depending on the implementation, a camera may be connected via wired connections, or via wireless connections.

Backup Service: a firmware or cloud based system configured via a frontend interface, to coordinate storage and/or retrieval of video data with a cloud storage system. For example, a "backup service" may be implemented on a gateway at a worksite.

Cloud Video Storage: a backend storage system designed to store any number (e.g., hundreds of billions) of objects (e.g., video) such that they can be retrieved from anywhere. Cloud video storage may be provided by a third-party, for example, in conjunction Cloud Storage Service.

Cloud Storage System (or "Cloud Storage Service"): a backend network (e.g., Internet) accessible storage system configured to provide video storage and retrieval services to a frontend system (e.g., a gateway). A cloud storage service may be provided by a third-party, such as Amazon's S3, Microsoft's Azure, or Google's Cloud Storage.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Event Data: data associated with an event, such as a set of sensor data (e.g., metadata and/or asset data), such as photographs, video files, etc., associated with a detected event.

Event Model (or "triggering criteria"): a set of logic that may be applied to sensor data to determine when an event has occurred. An event model may be, for example, an algorithm, statistical model, or neural network that takes as input one or more types of sensor data, such as a standard-resolution video stream from each of one or more cameras. An event model may be stored in any format, such as a list of criteria, rules, thresholds, and the like, which indicate occurrence of an event. Event models may also receive input from a feature detection component configured to detect features in video data. Event models may be executed by a local and/or cloud site visibility system.

Event models and/or feature detection may be performed by using machine learning components that can be used to assist in identification of features (e.g., a person within a restricted area) that may trigger events. For example, a machine learning component can implement machine learning algorithms or artificial intelligence (AI) to generate and/or update neural networks that are executed by a processor (e.g., at a local and/or cloud site visibility system). In some embodiments, the machine learning component can use one or more machine learning algorithms to generate one or more models or parameter functions for the detections. A feature detection module may comprise a plurality of layered and/or hierarchical models that each produce an output that is pooled together. Further, the feature detection module may comprise a thin layer of models that is independently defined and tunable. The machine learning component can be configured to generate an event model that understands which types of data indicate which types of detections. One or more of these event models may be used to determine an expected value or occurrence based on analysis of received data. In some embodiments, event models can include event detection criteria designated by a user, admin, or automatically. For example, the criteria can indicate which types of detected features to monitor, record, or analyze. By designating specific types of detections, resources (e.g., processing power, bandwidth, etc.) can be preserved for only the types of feature detections desired. Additional details regarding event detection processes are discussed in related U.S. application Ser. No. 17/741,104, titled "MULTISTREAM CAMERA ARCHITECTURE," filed May 10, 2022, which is hereby incorporated by reference in its entirety and for all purposes.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the local site visibility system may be regenerated on a periodic basis (e.g., by the cloud site visibility system) as new received data is available to help keep the predictions in the event detection model more accurate as the data is collected over time.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Feature detection: a computerized process that processes video data to identify features in one or more images of the video data and which may be provided to one or more event models to determine if an event of interest is detected. Feature detection may be performed by a local site visibility system and/or at a cloud site visibility system to detect events of interest, such as safety events.

High-resolution video stream: video files that are renderable to depict significant detail. For example, high-resolution video may be 1080p, 1440p, 2K, 4K, 8K, etc. video. The term high-resolution video does not signify any particular resolution or frame rate, but more generally indicates a video file that holds more image detail than a corresponding low-resolution video.

HTTP Live Streaming (HLS): HTTP Live Streaming is an HTTP-based adaptive bitrate streaming communications protocol, and has widespread support in media players, web browsers, mobile devices, and streaming media servers.

Low-resolution video stream: video files that are renderable to depict less detail than a corresponding standard or high-resolution video file. For example, low-resolution video may be 240p or 360p or less. The term low-resolution video does not signify any particular resolution or frame rate, but more generally indicates a video file that holds less image detail than a corresponding high-resolution video.

Playlist: information indicating where video segments are stored, and that can be used to retrieve stored video segments. In the examples herein, video segments may be stored in three places: (i) in a local storage system that receives video from cameras at a worksite (e.g., a network video recorder (NVR)), (ii) in a "cache" storage system that may be located at the worksite, or having a fast communication link to a server associated with the worksite, such as to allow streaming of video in response to a stream request from a user (e.g., the cache storage system may be separate from a cloud storage system used for long-term video storage), and/or (iii) a cloud storage system. Each of these storage systems has information indicating the video segments stored therein, and this information can be queried and provided from these storage systems in the form of a playlist.

Network Video Recorder: a video storage system that is configured to receive video streams from one or more cameras, such as at a worksite, store the video streams for a certain amount of time, and when requested provide the stored video streams for viewing or for storing in a cloud backup database or a non-cloud backup database.

Video Gateway System ("Gateway"): a system at a worksite (or other location) coupled to multiple cameras on a network, such as multiple cameras at a worksite. In some embodiments, a gateway includes a site visibility system that determines video stream capabilities of each camera and, based on the capabilities, determines whether any additional video steams need to be created for particular cameras. For example, for cameras that provide only a high-resolution video stream, the gateway may generate a standard-resolution video stream for artificial intelligence ("AI") analysis and a low-resolution video stream for viewing by a user.

In some embodiments, a gateway includes a backup service configured to communicate with cloud storage services. In some embodiments, the gateway is in communication with a backup service that is separate from the gateway. The gateway may include storage components for storing the received video streams, for example, a network video recorder (NVR). The gateway may also include one or more computers (e.g., an NVR server) configured to provide video stored on the gateway for viewing. The one or more computers are also configured to provide the video stored on the gateway to a cloud storage system for longer term storage, such as in response to instructions from a backup service executing at the gateway.

Standard-resolution video stream: video files that are renderable to depict less detail that high-resolution video files. For example, standard-resolution video may be 720p video. The term standard-resolution video does not signify any particular resolution or frame rate, but more generally indicates a video file that holds less image detail than high-resolution video and more detail than low-resolution video.

Video: For ease of reference, the term "video" as used herein refers to data generated by any sensor, including a camera, over a period of time, either continuously or at discrete points in time, or both.

Illustrative Examples of Gateway Process

FIG. 1 is a block diagram of an example of a system (environment) 100 for monitoring a worksite with multiple cameras, and storing the video on local storage systems and cloud backup systems. The system 100 includes a frontend computing system ("frontend") 103 and cloud storage system ("backend") 105. The frontend 103 includes a gateway 150 which includes a backup service 113 configured to communicate with the backend 105 regarding storage and/or retrieval of video generated by the multiple cameras 110. In the example of FIG. 1, the backend 105 includes a cloud backup service 120 and a cloud backup video storage 130, which is where the video is actually stored on the backend 105. Gateway 150 can be located at or near a worksite. The cloud storage service 120 is configured to communicate with the backup service 113 information relating to storing and/or retrieving video on the cloud video storage 130. The cloud storage service 120 may also be configured to provide video to the cloud video storage 130, and retrieve stored video from the cloud video storage 130.

In this example, gateway 150 includes a backup service 113 and a NVR service 102. The NVR service 102 is a communication interface configured to communicate with a plurality of cameras 110A-N positioned at different locations associated with a physical location. The NVR service 102 receives data from cameras 110A-N. The cameras 110A-N may be manufactured by different entities and have different capabilities. For example, camera 110A may be configured to output only a single video stream (e.g., a high-resolution video stream), while camera 110B may be configured to output multiple video streams (e.g., a high-resolution and a low-resolution video stream). The NVR service 102 is configured to store received video on a data recording system, for example, a network video recorder 104. The NVR service 102 is also configured to communicate stored video to the backup service 113, when requested (e.g., for backup to the cloud backup (S3) video storage 130). In this example, the backup service 113 and the NVR service 102 are illustrated as being part of the gateway 150. In some implementations, the backup service 113 and NVR service 102 are two systems that are in communication with each other, but may be housed separately and even located apart from each other.

The backup service 113 is configured to communicate information relating to backing-up video with the cloud storage service 120, and communicates video for backup the cloud backup system 130. For example, the backup service 113 is configured to receive video frames from the NVR service 102, consolidate the video frames, generate video metadata 118 and backup reports 119 indicative of the video to be stored, and communicate the video to the backend cloud video storage system 130, as described further below.

The backup service 113 can include one or more configuration ("config") files 106 that include information relating to the operations of the backup service 113. A config file 106 can be received in a communication 121 from the cloud storage service 120 to the backup service 113. The config file 106 constantly checks on what is stored and where to send the aggregated segments (archives). In an example, a config file 106 can include information relating to: turning cloud backup functionality on/off, a changeable and configurable retry interval and frequency, a video upload size, the number of concurrent streams, and a time delay before a stream will be processed to be stored in the cloud backup video storage 130 (e.g., t=current time, guarantee that no frames with a timestamp newer than t-upload_delay will be uploaded to the backup service 113)—this will give the backend enough time to backup any segments it has streamed over HLS live view and mark those segments as being uploaded, etc.). In some embodiments, the backup service 113 may only upload at night or another desired time when more computing resources/bandwidth maybe available, and in such implementations the video frames may be aggregated during the day and config files may be requested earlier in day to prepare for the later uploads.

Once enabled for a certain video stream, the backup service 113 will upload from the NVR service 102 stored video for that video stream. The backup service 113 is configured to aggregate video into one or more segments 116. Once enough video is aggregated in the segment(s) to form a video asset (e.g., to meet the video upload size), the backup service 113 can communicate the video asset to the cloud video storage 130.

In an example of operation, the backup service 113 sends a request 114 to the NVR service 102 for video to upload. The request 114 can include camera information, video stream information, and duration of each video segment (e.g., the next frame to upload, duration of the video segment). In response to the request 114, the NVR service 102 provides a stream of frames 115 to the backup service 113. The backup service 113 can provide various status information to the NVR service 120, for example, status of the retrieved video frames (successful or unsuccessful), and other various handshaking communications. The backup service 113 aggregates the received frames into a segment 116, generates metadata 118 corresponding to the video asset, and creates a backup report 120 which includes details of the video contained in the segment to me uploaded e.g., the video asset. For example, the cloud backup report can include one or more of the following:

report ID

A unique report ID generated by the frontend 103 firmware (e.g., backup service 113) for each request to get storage information for the video asset (e.g., an S3 URL).

The report ID can also be contained in the upload stats. This allows matching of the S3 URL requests with the uploads, which can be used as an auditing/debugging tool.

report generation timestamp

This timestamp along with the timestamp in the upload stats can be used to calculate time between the following events:

S3 URL request→upload started→upload complete camera info stream info channel info video start time video duration upload file size upload file type video file MD5 hash, which can be used to verify the integrity of the file that gets uploaded to the S3 URL.

frame metadata list: bytes Offset, bytes count, timestamp, duration of video, keyframes of video A file system 140 is a storage system that resides on the frontend 103 that receives information from the cloud backup service 120, and is configured to store video 140, metadata 144, and backup reports 146. The backup service 113 can provide video and information to the file system 140 for storage. In an example, the backup service 113 can provide copies of a video asset 142, and corresponding metadata 144 a backup report 146 to the file system 140. In some embodiments, the file system 140 can be accessed locally to obtain information on what was stored on the cloud storage system, and access the video 142 and its corresponding information if it is available.

In some embodiments, when the backup service 113 operates to backup video, the backup service 113 can send a request 122 to the cloud storage service 120 for a backup to occur and provide a backup report for the next video asset it plans to store. In response, the cloud backup service 120 provides a communication 124 to the backup service 113 that includes a storage location for the video asset on the cloud storage system (e.g., a S3 URL). The backup service 113 then communicates 126 the video asset to the cloud video storage 130 for storage at the indicated storage location.

If the upload to the cloud video storage 130 is successful, the backup service 113 can remove uploaded files, and sends a success message to the NVR service 102. Data corresponding to the successfully uploaded video can be removed from the NVR 104. If the upload to the cloud video storage 130 was unsuccessful, the upload can be retried a number of times. In some embodiments, the number of times the upload is retried is predetermined. In some embodiments, the number of times an upload is tried is dynamically determined. For example, based on a determined importance of the video, size of video, etc. If the retry limit is reached, an upload anomaly can be logged and any portions of the uploaded video asset that failed to wholly upload can be removed from the cloud backup service storage.

As indicated above, the backup service 113 can process configuration changes, generate video assets, and upload them for backup. In an example, once the backup service 113 is enabled for storing video to the backend 105, the backup service 113 can scan the NVR service 102 configuration for streams with a backup flag set to true. The NVR service 102 can then use the NVR service 102 to grab video frames that are ready for upload for those streams. Per stream, these frames can be concatenated into a larger segment 116 file by the backup service 113 which also generates the corresponding metadata 118. The segment and its metadata file 118 can be containerized into a video asset (or archive) that is ready for upload to the cloud video storage 130. The backup service 113 can generate a cloud backup report and present the report in a request to the cloud storage service 120, which provides a response that contains information (e.g., a S3 URL) to the backup service 113 indicating where to upload the archive. The backup service 113 then can start uploading the archive to the cloud video storage 130. There may be a limit on the number of concurrent uploads. Once this limit is reached, the backup service 113 can wait for uploads to complete before grabbing new frames and creating new aggregated segments 116. Statistics relating to each upload are saved. The backup service 113 may periodically upload these statistics to track the state of the cloud backup service (e.g., number of pending uploads, number of failed uploads, average time to upload file, average file size).

Figure 2:
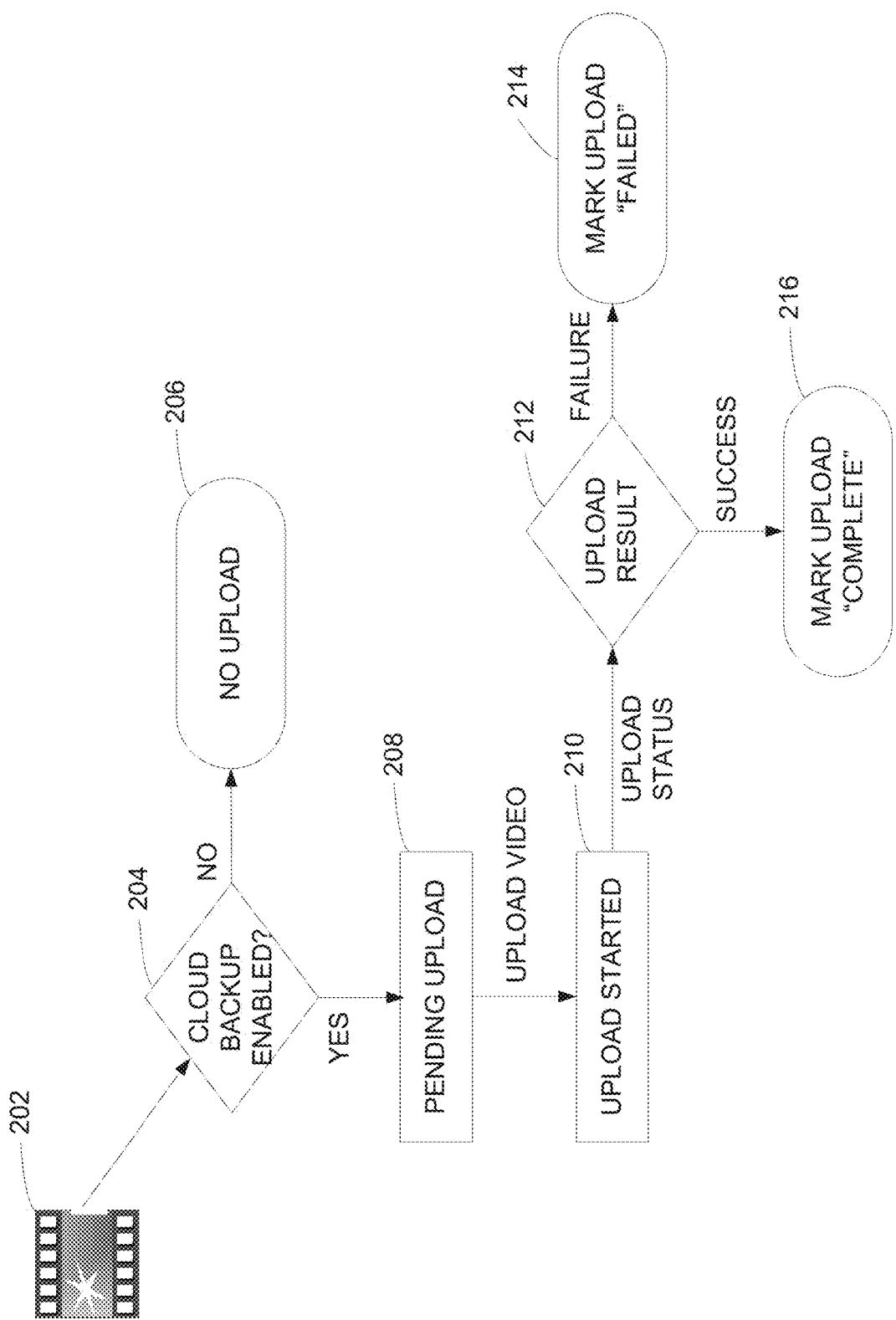
FIG. 2 is a block diagram of an example of a NVR database (DB) "upload state" state machine.

FIG. 2 is a block diagram of an example of a database (DB) "upload state" state machine indicating the state of uploading video streams from the backup service 113 (FIG. 1) to the cloud video storage 130. At the start, a new video segment 202 from a camera is received at the gateway 150. At block 204 the backup service 113 process determines if cloud backup functionality is enabled. If it is not (NO), the upload state is set in the DB as "NO UPLOAD" and the new video segment 202 is not uploaded. If cloud backup is enabled (YES), at block 208 the upload state is set to "PENDING UPLOAD." In some examples, the video segment 202 resides on the backup service 113 for a certain amount of time, for example, based on time of day, other uploads occurring, system performance, while video aggregation of video frames occurs to generate the asset to upload, etc. As the backup service 113 begins to upload the video segment 202 to the cloud video storage 130, at block 210 the upload state in the DB is set to "UPLOAD STARTED." When the upload has finished, the upload status is checked and at block 212, the result of the upload is determined. If the upload failed, at block 214 the upload state in the DB is set to "FAILED." If the upload completed properly, at block 216 the upload state in the DB is set to "COMPLETE."

When an upload from the backup service 113 to the cloud video storage 130 occurs, numerous upload statistics can be generated and saved (e.g., in a database or file, e.g., a backup report) for each upload attempt. In an example, the upload statistics can include camera info, a report ID, a start time and duration for the video stream, a state of the upload (started/success/failure), an error type, retry count (e.g., number of retry attempts or "counts"), the upload URL, time to upload the video segment, upload timestamp, upload file size, upload file codec, and upload container type (e.g. MPEG2TS). Periodically, the backup service 113 may upload cloud backup state statistics, for example, cloud backup state statistics that include (i) the number of files pending upload, and/or (ii) the number of failed upload attempts.

Figure 3:
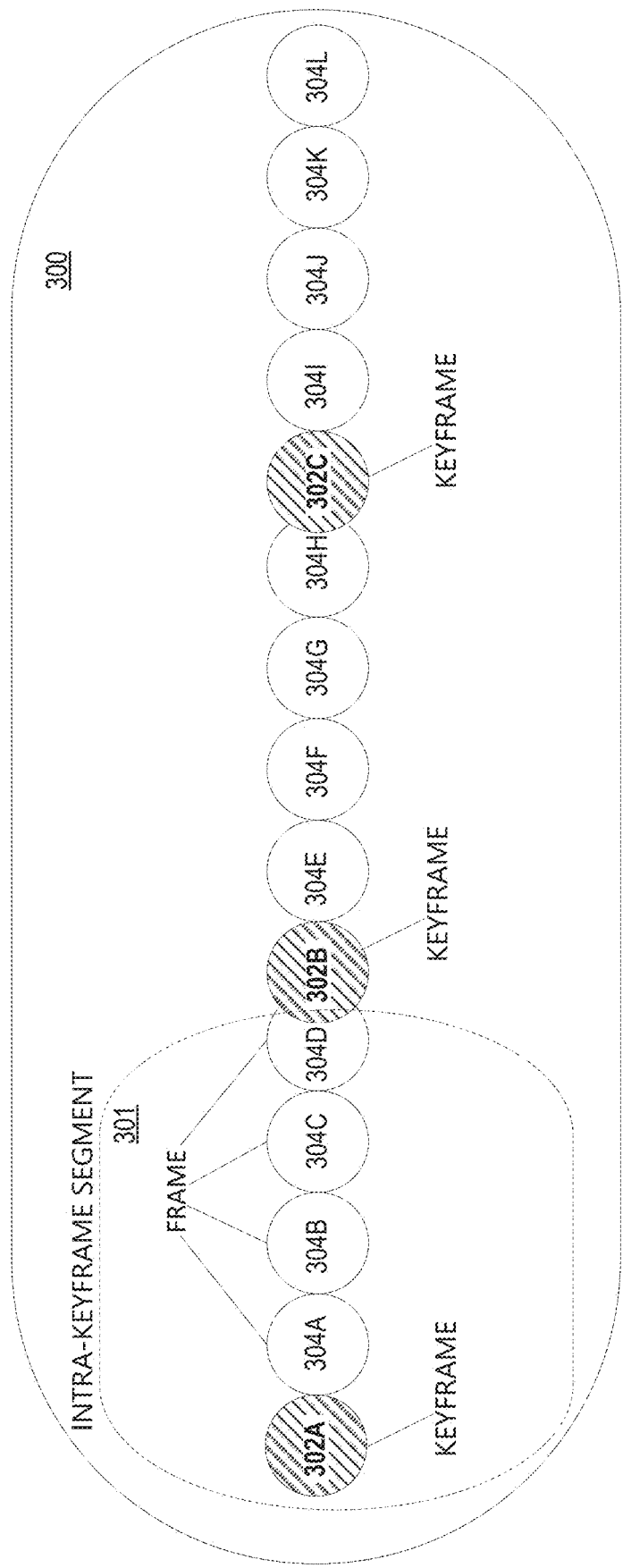
FIG. 3 is an example of a cloud backup video file, according to some embodiments.

FIG. 3 is an example of a video segment 300, or a portion of a video segment, provided by a camera, which may be aggregated into an archive and stored on the cloud video storage 130. The video segment 300 includes keyframes 302A-C, and each keyframe 302 is associated with one or more frames. In this example, keyframe 302 is associated with frames 304A-D, keyframe 302B is associated with frames 304E-H, and keyframe 302C is associated with frames 304I-L. The video segment 300 includes one or more intra-keyframe segments 301, wherein each intra-keyframe segment includes a keyframe and its associated frames. In this example, intra-keyframe segment 301 includes keyframe 302A and its associated frames 304A-D.

Figure 4:
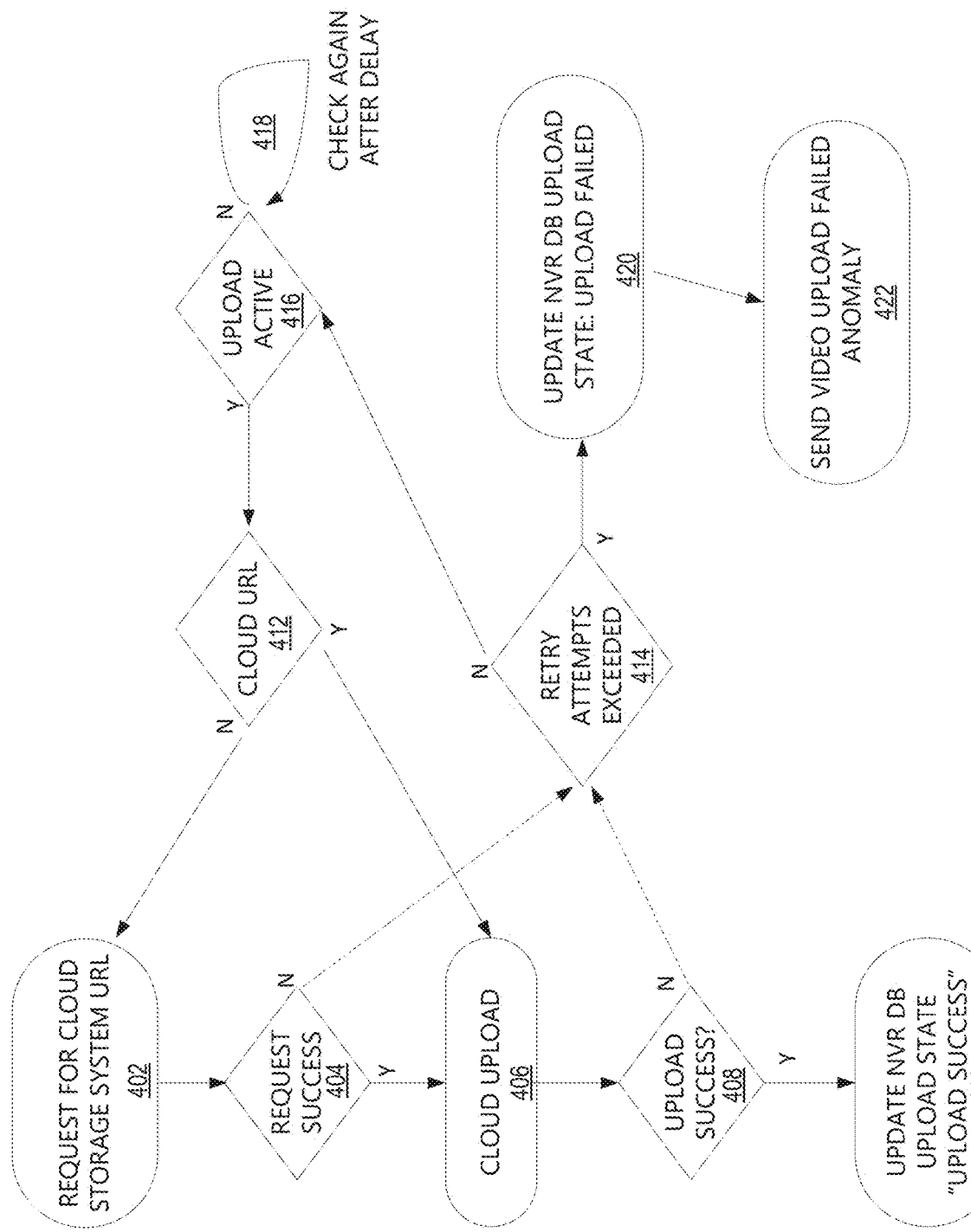
FIG. 4 is an example of retry logic which can be used in a backup service for uploading video segments, including for example, in the backup service illustrated in FIG. 1.

FIG. 4 is an example of a retry logic process which can be used in a backup service for uploading video archives to a cloud storage, including for example, in the backup service 113 illustrated in FIG. 1. At block 402 the process requests a storage location for the video on the cloud video storage 130. This example refers to using a S3 URL (e.g., for an Amazon service), however, as one of skill in the art will understand, in other examples, other types of storage location indicators can be used (e.g., for Microsoft's Azure, or Google's Cloud Storage or cloud hosted file storage). At block 404, if the request is successful the process proceeds to block 406 where it proceeds to upload video to the provided S3 URL location. If the request for a S3 URL was not successful, the process proceeds to block 414 where it determines if the number of retry attempts has been exceeded. At block 408 the process determines if the upload was a success, and if so, a process proceeds to block 410 and updates the network video recorder database upload state to indicate upload success for the uploaded video. If the process determines at block 408 the process was not a success, it proceeds to block 414 where it determines if the number of retry attempts has been exceeded.

If the number of retry attempts was exceeded for requesting the S3 URL at block 402, or if the number of retry attempts was exceeded for uploading the video to the S3 URL at block 406, the process proceeds to block 420 and updates the network video recorder database upload state to indicate upload failed, and then proceeds to block 422 where it sends a message indicating that the upload failed, and can send information relating to any anomaly that was detected during the failed request for the S3 URL or failed upload.

If at block 414 the number of retry attempts has not been exceeded, the process proceeds to block 416 where it determines if the upload is still active, and at 418 can check again (or multiple times) if the upload is still active. If it is, the process can proceed to block 412, and then to block 402 for the case where the request for the S3 URL failed, and to block 406 for the case with the S3 failed, and the process can reattempt to either request another S3 URL at block 402 or perform the S3 upload at block 406.

Figure 5:
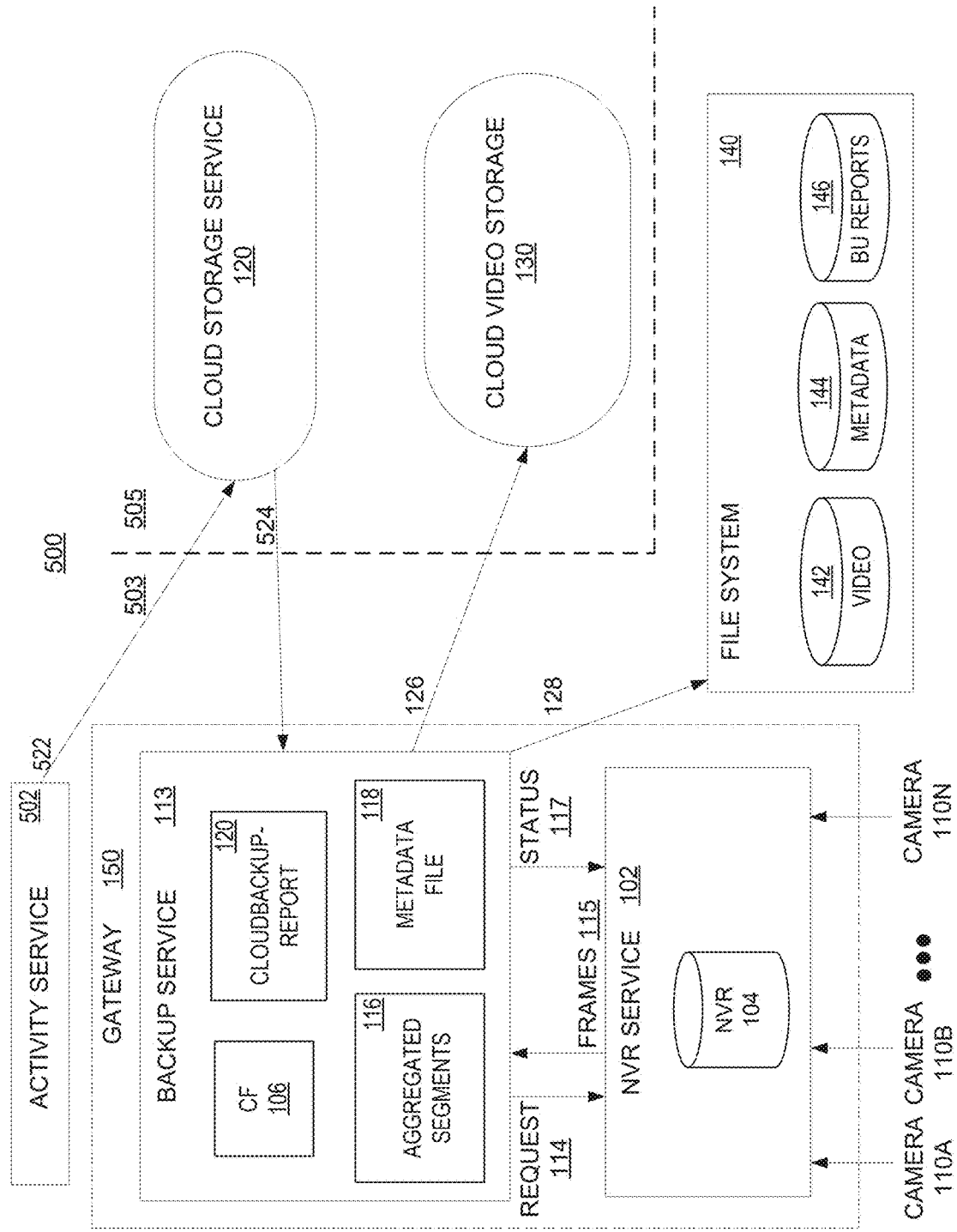
FIG. 5 is a block diagram of another example of a backup system and backup service functionality for a system with multiple cameras communicating with a network video recorder (NVR), and where the backup service is configured to store video segments (or streams) on a backend cloud video storage system.

FIG. 5 is a block diagram of another example of a backup system 500 for monitoring a worksite with multiple cameras110, and storing the video on local storage systems 140 and on cloud video storage 130 using a cloud storge service 120. The system 500 includes a frontend computing system ("frontend") 503 and cloud computing system ("backend") 505. The frontend 503 includes a gateway 150 having a backup service 113 which communicates with the backend 505 to store aggregated video segments, generated by the cameras, on the backend 505. Similar to the system in illustrated in FIG. 1, the backend 505 includes a cloud storage service 120 and a cloud video storage 130 where the aggregated video is stored. The cloud storage service 120 communicates, with the backup service 113, information relating to storing and/or retrieving video on the cloud video storage 130. The backup service 113 is also configured to provide video to the cloud video storage 130, and retrieve stored video from the cloud video storage 130.

Many components illustrated in system 500 are similar to those shown in FIG. 1. In various embodiments, the system 500 is configured to upload activity-based video, that is, video that was determined to depict an activity. For example, video depicting location of a worksite when an activity occurred at the location. The activity can be, for example, a person or a vehicle arriving at the location or leaving the location. In another example, the activity can be any change in the scene. For example, a fire, flood, water leak, structural breakage, or any other event where the location undergoes a change. In an example, a camera may be imaging a particular location of the worksite where the location is static or nearly so, and an activity can be any change in the scene such that pixels in one frame are different than the pixels from a previous frame.

In this example, the system 500 includes an activity service 502 that receives activity data (e.g., statistics) of video captured by the cameras. The activity service 502 can be a component (e.g., a process) of the backup service, or a separate system (e.g, a $3^{rd}$ pry system). In some embodiments, one or more activity models monitor video stored on the NVR service 102, the file system 140, and/or the cloud video storage 130 to determine if the video depicts an activity. In this example, when activity data indictive of an activity occurring is received by the activity service 502, the activity service 502 provides a message 522 to the cloud storage service 120 with metadata related to the video depicting the activity. In response, the cloud storage service 120 sends a request 524 for the video that contains the detected activity. The request 524 may include video information derived from the metadata, including for example, information identifying the video, the starting point (e.g., frame) of the requested video, the duration of the requested video stream, and a location indicating where the video is to be stored. The backup service 113 then can retrieve the requested frames from the NVR service 102 (if they are not already stored on the cloud video storage 130), and upload them to the indicated storage location, as described in reference to FIG. 1. The backup service 113 can also store relevant video 142, its metadata 144, and associated cloud backup reports 146 on a local file system 140.

Figure 6:
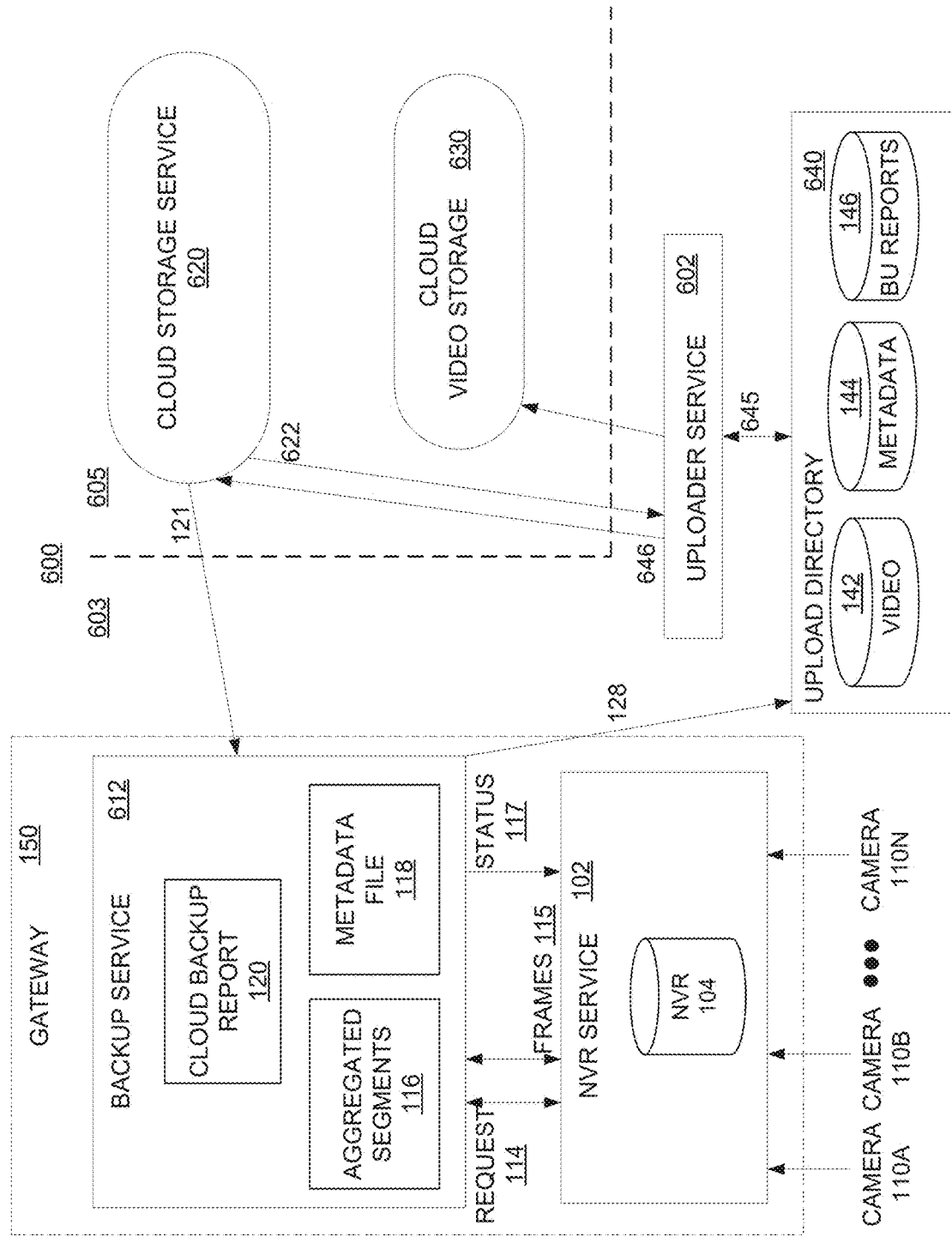
FIG. 6 is a block diagram of another example of a backup system and backup service functionality for a system with multiple cameras communicating with a network video recorder (NVR), and where the backup service is configured to store video segments (or streams) on a backend cloud video storage system.

FIG. 6 is a block diagram of another example of a backup system 600 for a monitoring system with multiple cameras 110 monitoring a worksite. In this embodiment, the functionality of uploading video to the cloud video storage 630 is performed by an uploader service 602. The uploader service 602 can be housed with/be a part of the gateway 150. For example, the uploader service can be a process that is performed by the computing system of the gateway 130. In some embodiments, the uploader service is separate from the gateway 150. One advantage of this implementation is that uploader service 602 may upload archives for storage without relying on the backup service 612 of the gateway functionality, once the archive is stored on the upload directory. Many components illustrated in system 600 are similar to those of system 100 (FIG. 1). The system 600 includes a frontend computing system ("frontend") 603 and cloud computing system ("backend") 605. The frontend 603 includes a gateway 150 which includes a backup service 613. The backend 505 includes a cloud backup service 620 and a cloud video storage 530, which video is actually stored. The cloud storage service 620 is configured to communicate, with the backup service 613, information relating to storing and/or retrieving video on the cloud video storage 630. The cloud video storage 630 is configured to receive video and provide retrieval of stored video.

In the embodiment of system 600, the backup service 613 is configured to communicate a request 114 with the NVR service 102 for a next video upload and retrieves 115 frames from the site visibility system for a certain video stream. The backup service 613 aggregates the retrieved frames into a segment 116 (video asset or archive) for storage, generates a corresponding metadata file 118, and generates a corresponding cloud backup report 120. The backup service 613 then communicates 128 the video archive 142, and its associated metadata 144 and backup report 146 to an upload directory 640 (on the frontend 603).

As illustrated in FIG. 6, system 600 also includes an uploader service 602 which can periodically check in upload directory 640 for video to upload. If video archive 142 and a corresponding backup report 146 are present in the upload directory 640, uploader service 602 sends a request 646 to the cloud storage service 620 requesting a location indicating where to store video on the cloud video storage 630. In response to the request 646, the cloud storage service 620 communicates 622 a location to the uploader service 602. Then, the uploader service 602 uploads the video 142 stored in the upload directory 640 to the cloud video storage 630 using the provided location.

Accordingly, the system 600 can process configuration changes received from the cloud storage service backend 620, generate the video assets, and write them to the upload directory 640. The uploader service 602 can monitor the upload directory 640 and continue uploading video 142 until all files in the upload directory are uploaded. There can be a limit on the number of concurrent uploads. Once this limit is reached, the backup service 613 will wait for uploads to complete before generating new video files and storing them in the upload directory 640. The uploader service 602 can also periodically upload statistics to track the state of the uploading service (e.g., number of pending uploads, number of failed uploads, average time to upload file, average file size).

To upload video files a cloud end point (EP) reachable from the gateway needs to be defined. As an example, the EP can be the cloud storage service (backend) 120 of FIG. 1. The gateway will send a request to this EP containing the cloud backup report and expect an S3 URL in response. The gateway will then attempt to upload the video files and metadata file to the identified storge location. Video uploaded to the cloud video storage will be accompanied by a metadata file that the cloud storage service 620, which will need to parse. For example, a video file (*.ts) and a metadata file that includes frame data (e.g., keyframes at t=0, 10, 20, . . . ). The metadata file will include metadata for each frame contained in the video. This can include, for example, byte offset, byte count, timestampMS, durationMS, keyframe, and codec. When the backend cloud storage service is notified that a file has been uploaded, the metadata file should be parsed to generate an inter-keyframe segment list and stored in the cloud backup database. An example of a portion of information that can be included in a cloud backup database table for a stored video stream is shown below, where each row is associated with a portion of a stored video segment:

| org_id | stream_id | start_ms | Duration_ms | S3 key | Byte offset | Byte Count | Expires at: |
|---|---|---|---|---|---|---|---|
| x | y | 10:00:00 | 10 seconds | (full video file) | 0 | 100 | <date, time> |
| x | y | 10:00:10 | 10 seconds | (full video file) | 101 | 200 | <date, time> |

The content of the above-illustrated table can be:
org_id: identification (ID) of the organization
stream_id: ID of the camera
start_ms: the start time in milliseconds
duration_ms: the duration in milliseconds
S3 Key: the S3 that identifies where the video is stored
Byte offset: the #bytes offset from the starting byte where this portion begins
Byte Count: the number of bytes in the indicated video portion
Expires at: date/time when the video can be/is deleted.

Example Backend Process

FIG. 7 is a block diagram of an example of a process flow and a system for fetching a video playlist to construct a requested video stream that includes a plurality of video segments which may be cached video segments, cloud backed-up video segments, and locally stored video segments. FIG. 8 also illustrates a process flow and a system for fetching a video playlist to construct a requested video stream that includes a plurality of video segments which may be cached video segments, cloud backed-up video segments, and locally stored video segments. In some embodiments, the requested video may be used by customers for monitoring a particular activity that occurred at a site. In some embodiments, the requested video may be used by customers for artificial intelligence (AI) or machine learning (ML) processes, for example, for training AI and ML processes.

The process in FIG. 7 generates a playlist that can be used to provide streaming video. As illustrated in FIG. 7, a stream request 702 can be received from a user's computer system (e.g., via the Internet) using an account that is authorized to access stored video associated with a worksite. The stream request 702 can be communicated to a cloud server 704, and then communicated to a video server 706. In this example, the video server 706 is a server associated with the worksite and processes video data backups, video data fetches, and other video processing associated with a particular worksite. In some examples, the video server can be associated with more than one worksite and communicates with a gateway of each worksite.

The video server 706 is configured to determine if video segments that are needed to provide requested video as indicated in the stream request 702 are available, and where they can be found. The video server 706 generates a "playlist" which includes the location of all the video segments that indicated in the stream request 702. In some examples, the video server 706 includes and updates an indexed database pointing to the file locations of the stored video needed for the playlist. The video is stored in an archive, which is an aggregated collection of video streams (e.g., generated by the backup service 113, FIG. 1). The indexed database can include information related to the video streams stored in an archive, and also include byte-offset information related to exactly where each individual stream is located in the archive. To generate the playlist, the video server 706 provides a query 705 to a video cache database (DB) 710 for information of video segments associated with the stream request 702. The video server 706 fetches information (e.g., a list) 707, generated in response to the query, from the video cache DB 710 of video segments that are needed to fulfill the stream request that are stored in the video cache storage 712. The video cache storage 712 is a cache storage system, not on the cloud, which can include a portion, or all, of video that is in the cloud backup storage 718.

The video server 706 also communicates 709 with cloud backup server 714 to fetch information (e.g., a list) 713 from the cloud backup DB 716 relating to backed-up video segments that are stored in the cloud backup storage 718 and that are needed to fulfill the stream request 702. The video segments that are stored in the cloud backup storage 718 may or may not be available in the video cache storage 712.

The process then determines a union of the lists of video segments that reside in the video cache storage 712 and the cloud backup storage 718 for stream request 702, that is, determines which of the needed video segments are on video cache storage 712 and the cloud backup storage 718, and which are not. In an example, the processing to determine a union of the lists can be done on the video server 706. If the union of the lists of videos reveals that the video caches storage 712 and videos on the cloud backup storage 718 are, together, sufficient to complete the stream request 902, the playlist can be completed. If the union of the lists is not sufficient to complete the playlist, the process can check to see if the additional video that is needed to complete the playlist is stored on a local device, for example, on the gateway 730 of the particular site where the video was generated. As described above, the gateway 730 includes storage of video generated by multiple cameras from that particular site, e.g., on a network video recorder, which is configured to provide a certain amount of local storage for video generated by the site cameras until it is backed-up to the cloud, or deleted.

In this example, the video server 706 communicates 711 with a hubserver 720 that is in communication with gateway 730. In some embodiments, the video server 706 may be in communication with more than one hubserver each in communication with a separate gateway. In some embodiments, the video server 706 may be in direct communication with the gateway. In this example, hubserver 720 communicates with a gateway server 732 and a NVR server 734 to receive information from a NVR DB 736 relating to video segments that are locally stored on the gateway 730. The process receives the information of recently captured video from site gateway 730, and completes the video playlist. The completed playlist information includes details of the stored location of each of the video segments to fulfill the stream request 702. Such a playlist then can be used by the video server 706 to fetch the video segments need to fulfill the stream request 702. Retrieving video from any of the video cache storage 712, cloud backup storage 718, and the gateway 130 may be quicker or take longer based on available resources. In some implementations, when requested video is available at two or more of the storage locations, the video server 706 can fetch the video from the location that can provide it the quickest.

FIG. 8 is a block diagram of an example of a process flow and system (the same system as illustrated in FIG. 7) for fetching video in response to the stream request 702 for streaming video using the playlist generated in reference to FIG. 7. The video segments can be initially fetched from the video cache storage 712, the cloud backup storge 718, or from a local storage device such as the gateway 730 (for example, for video that has not yet been backed-up to the cloud backup storage 718). If information on the playlist from the video cache DB 710 indicates that a requested video segment exists in the video cache storage 712, the video that exists in the video cache storage 712 can be fetched 802 by the video server 706 when it is needed to stream to a user. For video segments that are not in the video cache storage 712, playlist is checked to determine whether the video segments are stored in the cloud backup storge 718, and if it is, the process retrieves the video 804 from the cloud backup storage 718 and stores the fetched video 804 in the video cache storage 712, and the video cache DB 710 is updated to indicate such video has been stored in the video cache storage 712.

If all of the video on the playlist is now not on the video cache storage 712, and if it exists on a local storage device (e.g., in the gateway 730), a process on the video server 706 can retrieve the video from a local storage device (a network video recorder) on the gateway 730, e.g., via the gateway server 732 and the NVR server 734. The process receives the fetched video 808 from the gateway 730, stores it on the video cache storage 712, and updates the video cache DB 710 to indicate such video has been stored. Once all of the video segments that are needed to fulfill the stream request playlist are stored in the video cache storage 712, the process can provide the video segments in a streamed video 810 to the requestor.

Figure 9:
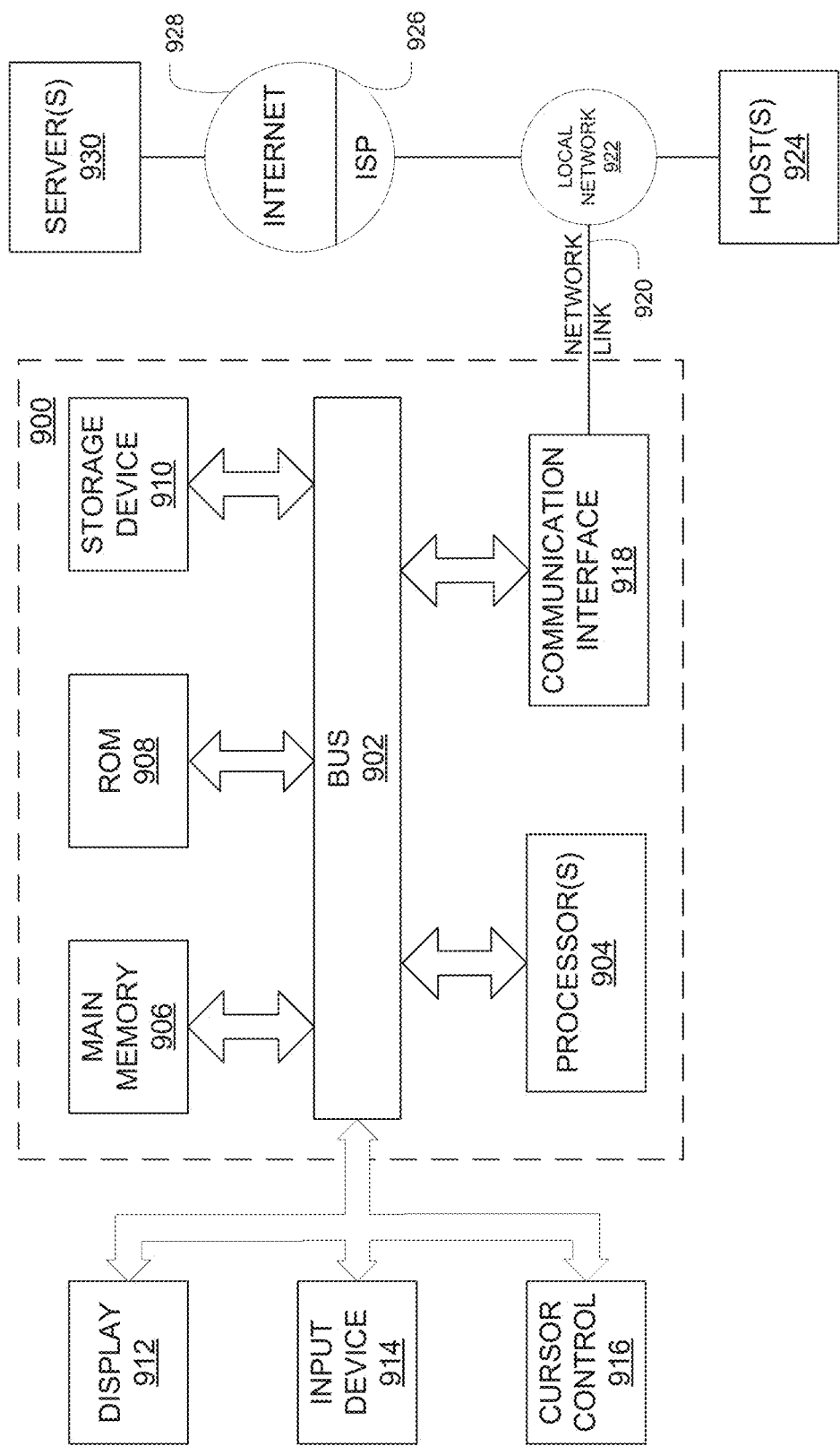
FIG. 9 is a block diagram illustrating an example of a computer system that can be used to perform the functionality described herein.

FIG. 9 is a block diagram that illustrates a computer system 900 upon which various embodiments of the systems and/or processes illustrated in FIGS. 1-4 and 5-8 may be implemented. For example, in various examples, the computer components of a video backup and retrieval system may be implemented as computer system 900. Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. The main memory 906 may, for example, include instructions to implement the cloud backup service and any components thereof, the site visibility system, a cache or video storage file system, a cloud storage service (backend), of a cloud backup (S3) video storage system and any other computer component in the figures.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicate with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

Figure 10:
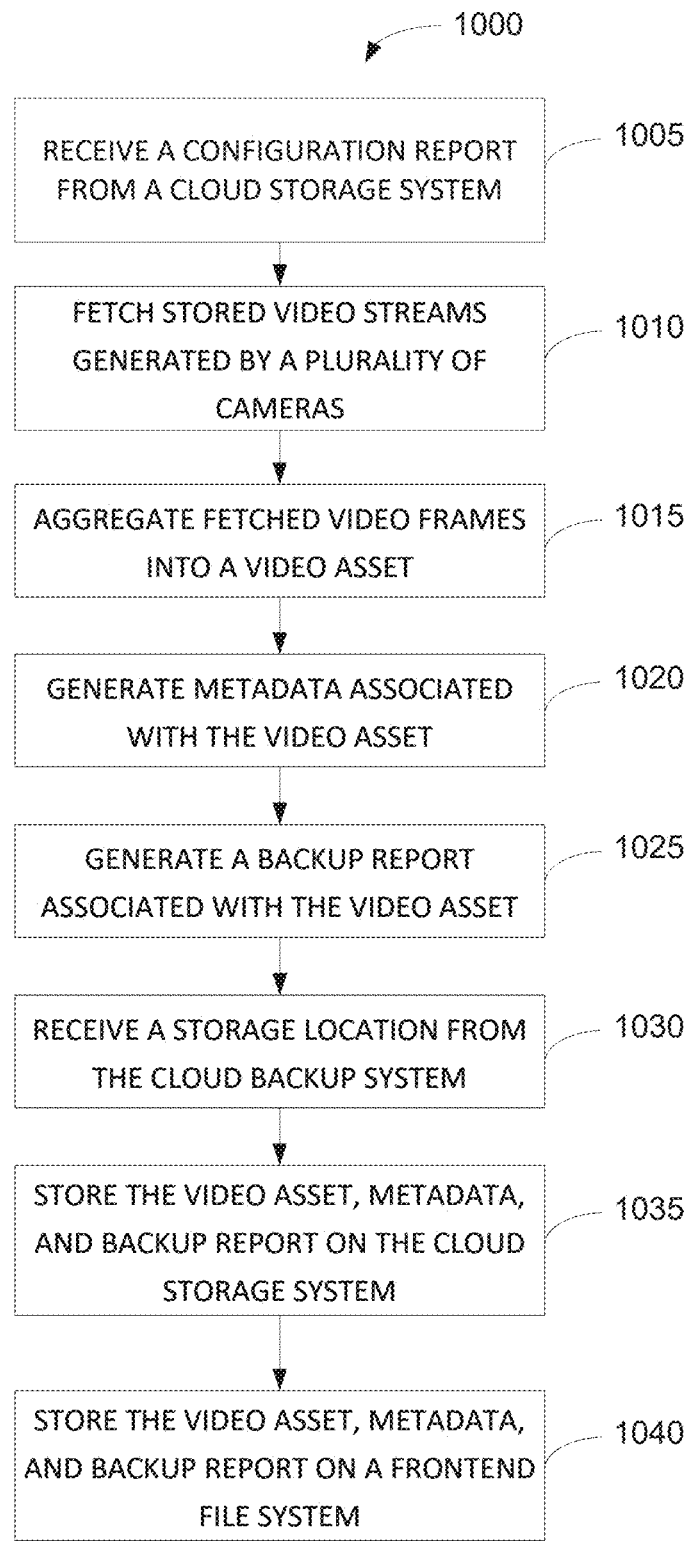
FIG. 10 is a flowchart illustrating an example of an embodiment of a process that may be performed for storing video, generated by multiple cameras at a worksite, on a cloud storage system.

FIG. 10 is a flowchart illustrating an example of an embodiment of a process 1000 that may be performed for storing video, generated by multiple cameras at a worksite, on a cloud storage system. In one example, the process 1000 can be performed by the backup service 113 on gateway 150 illustrated in FIG. 1.

At block 1005 the process receives a configuration report from the cloud storage system. The configuration report includes information associated with backing-up video on the cloud storage system. For example, in some embodiments the configuration file includes information indicating whether backup functionality is enabled, or not. At block 1010, the process fetches, from the gateway, stored video streams that were generated by a plurality of cameras at a site. In an example, the video streams are stored on the gateway on a network video recorder. At block 1015, the process aggregates the fetched video frames into a consolidated video asset (or archive), which is the file that will be stored on the cloud backup system. At block 1020, the process generates metadata associated with the video asset. The metadata can include information relating to the location of each video stream in the video asset. For example, what streams are in the video asset and where in the video asset a particular video stream begins. In an example, the location of the video asset is indicted by a bit offset which indicates where the video stream starts relative to another location in the video asset, for example, the beginning of the video asset, or relative to the start of another video stream.

At block 1025, the process generates a cloud backup report associated with the video asset. In an example, the cloud backup report includes camera information and stream information of each video stream stored in the video asset. At block 1030 the process communicates with the cloud storage system to receive a cloud storage location indicating where to store the video asset on the cloud storage system. At block 1035 the process then communicates the video asset to the cloud storage system based on the location information. In some embodiments, the backup service 113 uploads the video asset to the cloud storage during a predetermined time (e.g., at night) or day (e.g., Saturday or Sunday) to minimize conflicts between the computer or network resources used for uploading the video asset and other computing tasks.

At block 1040, the process then communicates the video asset, and its corresponding metadata backup report to a frontend file system, such that the video asset, the metadata, and the backup report on the frontend file system will be duplicative of the video asset, the metadata, and the backup report on the cloud storage system at least for a period of time. As indicated herein, this process is performed by one or more computer hardware processors configured to execute computer-executable instructions stored on a non-transitory computer readable medium.

Figure 11:
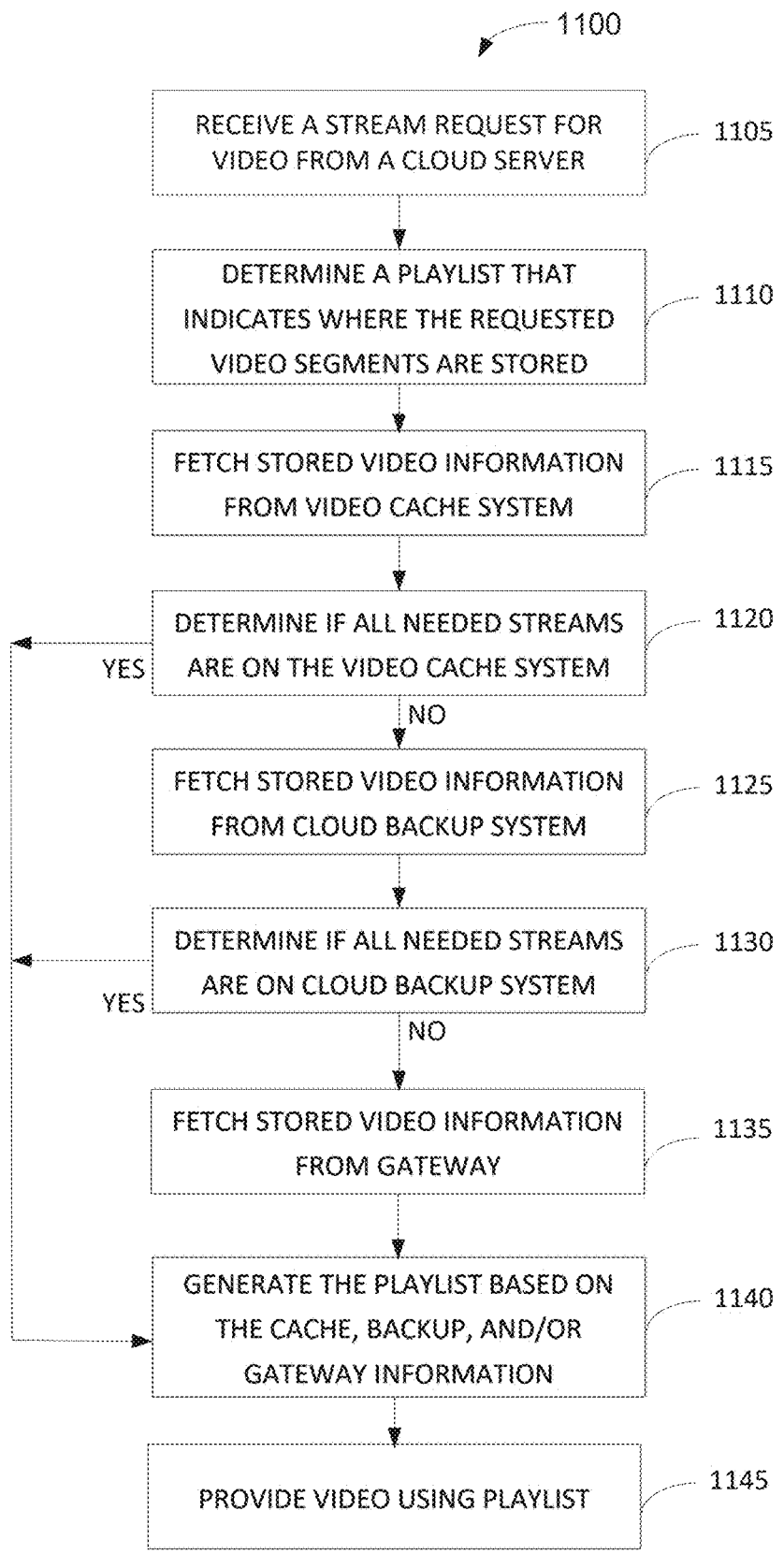
FIG. 11 is a flowchart illustrating an example of an embodiment of a process that may be performed for generating a playlist to use for providing streaming video based on a user request, and then for providing the video based on the playlist.

FIG. 11 is a flowchart illustrating an example of an embodiment of a process 1100 that may be performed for generating a playlist to use for providing streaming video based on a user request, and then for providing the video based on the playlist. Process 11 can be performed, for example, by the system illustrated in FIG. 7. For example, video server 706. At block 1105 the process receives a stream request for video from a user via a cloud server. At block 1110, the process determines a playlist that indicates where the video segments needed to fulfill the stream request are stored. To determine the playlist, the process can perform the steps indicated in blocks 1115-1140. At block 1115, the process fetches, from a video cache system, cache information indicating video segments needed to fulfill the video stream request that are stored on the video cache system. At block 1120, the process determines, based on the cache information, if all the video segments needed to fulfill the video stream request are stored on the video cache system. If all the video segments needed to fulfill the video stream request are stored on the video cache system, the process proceeds to block 1140 and generates the playlist based on the cache information.

If not, at block 1125 the process fetches from a cloud backup system backup information indicating video segments that are needed to fulfill the video stream request that are stored on the cloud backup system. At block 1130, the process determines based on received cache information and backup information, if it has location information for all the video segments that are needed to fulfill request. That is, if the video needs to provide for the stream request are stored on the video cache system and the cloud backup system. If all the video segments needed to fulfill the video stream request are stored either on the video cache system of the cloud backup system, the process proceeds to block 1140 and generates the playlist based on the cache information and the cloud backup information.

If all the video segments needed to fulfill the video stream request are not stored either on the video cache system of the cloud backup system, at block 1135 the process fetches from a gateway system storage information of video segments that are needed to fulfill the video stream request that are stored on the gateway system. The process then proceeds to block 1140 and generates the playlist based on received cache information, the backup information, and the storage information. At block 1145, the process provides the video to fulfill the stream request using the playlist. As described above, the process can be performed by one or more computer hardware processors configured to execute computer-executable instructions stored on a non-transitory computer readable medium.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A video gateway system, comprising:
a computing system comprising a hardware computer processor, and a non-transitory computer readable medium having software instructions stored thereon, the software instructions executable by the hardware computer processor to cause a backup service on the computing system to perform operations comprising:
communicate with a plurality of cameras positioned at different locations associated with a physical location and at least temporarily store the video streams generated by each of the plurality of cameras;
receive a configuration file from a backend cloud storage service, the configuration file including information associated with backing-up video on a cloud storage system including whether backup functionality is enabled;
fetch stored video frames that were generated by multiple of the plurality of cameras;
aggregate the fetched video frames into a consolidated video asset for storage on the cloud storage system;

generate metadata associated with the consolidated video asset, the metadata including information relating to respective locations of each video stream in the consolidated video asset;

generate a cloud backup report associated with the consolidated video asset, the cloud backup report including camera information and stream information of each video stream stored in the consolidated video asset;

communicate with the cloud storage system backend to receive a cloud storage location information indicating an assigned location within the cloud storage system for storage of the consolidated video asset;

communicate the consolidated video asset to the cloud storage system based on the location information so that the consolidated video asset is stored at the assigned location within the cloud storage system; and communicate the consolidated video asset, the metadata, and the backup report to a frontend file system, such that the consolidated video asset, the metadata, and the backup report on the frontend file system will be duplicative of the consolidated video asset, the metadata, and the backup report on the cloud backup video storage system for a period of time.

2. The video gateway system of claim 1, further comprising a network video recorder configured to store video streams from the plurality of cameras.

3. The video gateway system of claim 2, wherein the computing system further comprises a feature detection component configured to perform feature detection on video stored on the network video recorder.

4. The video gateway system of claim 2, further comprising an activity service that monitors video streams stored on the network video recorder to detect an activity that is depicted in the stored video streams.

5. The video gateway system of claim 4, wherein the backup service fetches video streams associated with a detected activity, aggregates the video streams into a video asset, and communicates the video asset to the cloud backup system based on the detected activity.

6. The video gateway system of claim 1, wherein the backup service receives a communication based on an activity service that monitors video streams stored on the frontend file storage system for activity, and based on the communication, the backup service fetches video streams associated with a detected activity, aggregates the video streams into a video asset, and communicates the video asset to the cloud backup video storage system.

7. The video gateway system of claim 1, wherein the backup service is configured to communicate the video asset to the cloud storage system at a predetermined time.

8. The video gateway system of claim 1, wherein the backup service is configured to communicate the video asset to the file system at a predetermined time.

9. The video gateway system of claim 1, wherein the backup service checks what is stored on the cloud backup system using the configuration file.

10. The video gateway system of claim 1, wherein the backup service determines what to store on the cloud backup system using the configuration file.

11. The video gateway system of claim 1, wherein the configuration file includes information relating to whether cloud backup functionality is on/off.

12. The video gateway system of claim 11, wherein the configuration file further includes a changeable and configurable retry interval and frequency, a video upload size, and/or the number of concurrent streams that can be uploaded.

13. A video gateway system, comprising:

a computing system comprising a hardware computer processor, and a non-transitory computer readable medium having software instructions stored thereon, the software instructions executable by the hardware computer processor to cause a backup service on the computing system to perform operations comprising:

communicate with a plurality of cameras positioned at different locations associated with a physical location and at least temporarily store the video streams generated by each of the plurality of cameras;

receive a configuration report from a backend cloud storage service, the configuration report including information associated with backing-up video on a cloud storage system including whether backup functionality is enabled;

fetch stored video frames that were generated by multiple of the plurality of cameras;

aggregate the fetched video frames into a consolidated video asset for storage on the cloud storage system;

generate metadata associated with the video asset, the metadata including information relating to the location of each video stream in the video asset;

generate a cloud backup report associated with the video asset, the cloud backup report including camera information and stream information of each video stream stored in the video asset;

communicate the video asset, the metadata, and the backup report to a frontend file system, such that the video asset, the metadata, and the backup report on the frontend file system will be duplicative of the video asset, the metadata, and the backup report on the cloud backup video storage system for a period of time;

communicate with the cloud storage system backend to receive a cloud storage location information indicating an assigned location within the cloud storage system for storage of the consolidated video asset; and communicate the consolidated video asset to the cloud storage system based on the location information so that the consolidated video asset is stored at the assigned location within the cloud storage system.

14. The video gateway system of claim 13, further comprising a network video recorder configured to store video streams from the plurality of cameras.

15. The video gateway system of claim 13, wherein the computing system further comprises a feature detection component configured to perform feature detection on video stored on the network video recorder.

16. The video gateway system of claim 13, further comprising an activity service that monitors video streams stored on the network video recorder to detect an activity that is depicted in the stored video streams.

17. The video gateway system of claim 16, wherein the backup service fetches video streams associated with a detected activity, aggregates the video streams into a video asset, and communicates the video asset to the cloud backup system based on the detected activity.

18. A method of storing video on a backend cloud storage system, the method comprising:

receiving a configuration report from the cloud storage system, the configuration report including information associated with backing-up video on the cloud storage system including whether backup functionality is enabled;

fetching stored video streams that were generated by multiple of a plurality of cameras;

aggregating the fetched video frames into a consolidated video asset;

generating metadata associated with the video asset, the metadata including information relating to the location of each video stream in the video asset;

generating a cloud backup report associated with the video asset, the cloud backup report including camera information and stream information of each video stream stored in the video asset;

communicating with the cloud storage system backend to receive a cloud storage location information indicating an assigned location within the cloud storage system for storage of the consolidated video asset;

communicating the consolidated video asset to the cloud storage system based on the location information so that the consolidated video asset is stored at the assigned location within the cloud storage system; and communicating the consolidated video asset, the metadata, and the backup report to a frontend file system, such that the consolidated video asset, the metadata, and the backup report on the frontend file system will be duplicative of the consolidated video asset, the metadata, and the backup report on the cloud backup video storage system for a period of time, wherein the method is performed by one or more computer hardware processors configured to execute computer-executable instructions stored on a non-transitory computer readable medium.

19. The method of claim 18, wherein the cloud storage system comprises a network video recorder configured to store video streams from the plurality of cameras.

20. The method of claim 18, wherein the cloud storage system comprises a feature detection component configured to perform feature detection on video stored on the network video recorder.

\* \* \* \* \*